United States Patent
Wang et al.

(10) Patent No.: US 12,486,411 B2
(45) Date of Patent: Dec. 2, 2025

(54) METHOD OF APPLYING A ONE-COMPONENT WATERBORNE COATING COMPOSITION TO A SUBSTRATE UTILIZING A HIGH TRANSFER EFFICIENCY APPLICATOR

(71) Applicant: AXALTA COATING SYSTEMS IP CO., LLC, Wilmington, DE (US)

(72) Inventors: Shih-Wa Wang, Glen Mills, PA (US); Michael S. Wolfe, Wilmington, DE (US); John R. Moore, Lansdale, PA (US); Petra Stoffel, Cologne (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 380 days.

(21) Appl. No.: 17/660,850

(22) Filed: Apr. 27, 2022

(65) Prior Publication Data
US 2022/0356359 A1 Nov. 10, 2022

Related U.S. Application Data

(60) Provisional application No. 63/182,447, filed on Apr. 30, 2021.

(51) Int. Cl.
| | | |
|---|---|---|
| *B05D 1/02* | (2006.01) | |
| *C09D 11/023* | (2014.01) | |
| *C09D 11/03* | (2014.01) | |
| *C09D 11/102* | (2014.01) | |
| *C09D 11/107* | (2014.01) | |
| *C09D 11/38* | (2014.01) | |

(52) U.S. Cl.
CPC ............ *C09D 11/023* (2013.01); *C09D 11/03* (2013.01); *C09D 11/102* (2013.01); *C09D 11/107* (2013.01); *C09D 11/38* (2013.01)

(58) Field of Classification Search
CPC .......... B05D 1/02; B05D 1/00; C09D 11/023; C09D 38/023
See application file for complete search history.

(56) References Cited

U.S. PATENT DOCUMENTS

| | | |
|---|---|---|
| 7,824,015 B2 | 11/2010 | Pauly |
| 8,091,987 B2 | 1/2012 | Van Den Bergen et al. |
| 2004/0217202 A1 | 11/2004 | Hynes |
| 2009/0030493 A1 | 1/2009 | Colborn et al. |
| 2014/0295091 A1 | 10/2014 | Stoffel et al. |
| 2015/0375258 A1 | 12/2015 | Fritz et al. |
| 2020/0291261 A1 | 9/2020 | Moore et al. |

FOREIGN PATENT DOCUMENTS

| | | | |
|---|---|---|---|
| CN | 107207739 | A | 9/2017 |
| CN | 111295424 | A | 6/2020 |
| CN | 111433301 | A | 7/2020 |
| WO | 2018206309 | A1 | 11/2018 |
| WO | 2019/109043 | * | 6/2019 |
| WO | 2020002252 | A1 | 1/2020 |
| WO | 2020/232011 | * | 11/2020 |
| WO | 2020232011 | A1 | 11/2020 |

OTHER PUBLICATIONS

Document #1: https://coatings.specialchem.com/product/a-basf-rheovis-as-1130 (Year: N).*
Book Title: Water-based coatings: Raw material selection, formula design, production process; Author: Zhang Xinghua; Press: China Light Industry Press; Publication Date: Jan. 31, 2000; pp. 47-52.
Book Title: Painter; Author: Zhang Yonghong; Press: China Building Materials Industry Press; Publication Date: May 31, 2020; p. 100.

\* cited by examiner

*Primary Examiner* — Tabassom Tadayyon Eslami
(74) *Attorney, Agent, or Firm* — Ingrassia Fisher & Lorenz, LLP

(57) ABSTRACT

A method includes applying a coating composition to a substrate through a high transfer efficiency applicator wherein the coating composition has a pH of greater than about 7 and comprises:
  A. a resin dispersion comprising a latex, a polyurethane, or combinations thereof;
  B. an optional cross-linker;
  C. an optional pigment;
  D. water;
  E. a water-soluble solvent; and
  F. at least one rheology control agent chosen from an alkali swellable emulsion, a layered silicate, and combinations thereof;
wherein the coating composition has a viscosity of about 20 to about 100 cps as determined using ASTM 7867-13 with cone-and-plate or parallel plates at a shear rate of 1000 sec-1, and
wherein the coating composition has a wet film thickness of at least 20 microns measured at about 45 degrees without visible sag.

18 Claims, No Drawings

METHOD OF APPLYING A ONE-COMPONENT WATERBORNE COATING COMPOSITION TO A SUBSTRATE UTILIZING A HIGH TRANSFER EFFICIENCY APPLICATOR

CROSS-REFERENCE TO RELATED APPLICATIONS

This application claims the benefit of U.S. Provisional Application No. 63/182,447, filed Apr. 30, 2021, which is expressly incorporated herein by reference in its entirety.

TECHNICAL FIELD

The present disclosure generally relates to applying a one-component waterborne coating composition to a substrate utilizing a high transfer efficiency applicator. More specifically, this disclosure relates to jetting a particular composition through the high transfer efficiency applicator wherein the composition includes at least one rheology control agent chosen from an alkali swellable emulsion, a layered silicate, and combinations thereof.

BACKGROUND

Ink jet printing is a non-impact printing process in which droplets of ink are deposited on a substrate, typically paper or textile fabrics, in response to an electronic signal. This application process has the advantage of allowing digital printing of the substrate which can be tailored to individual requirements. The drops can be jetted onto the substrate by a variety of inkjet application methods including continuous and drop-on-demand printing. In drop-on-demand printing, the energy to eject a drop of ink can be from a thermal resistor, a piezoelectric crystal, acoustic or a solenoid valve. These methods use high transfer efficiency applicators.

In the automotive industry, a vehicle body is typically covered with a series of finishes including an electrocoat, a primer, a colored basecoat providing the color and a clear topcoat to provide addition protection and a glossy finish. Currently most automobile bodies are painted in a single color with the basecoat being applied in a single spray operation. The coating is applied with pneumatic spray or rotary equipment producing a broad jet of paint droplets with a wide droplet size distribution. This has the advantage of producing a uniform high-quality coating in a relatively short time by an automated process.

However, this process has a number of disadvantages. If the vehicle body is to be painted with multiple colors, for example if a second color is used for a pattern such as a stripe, or if a whole section of the vehicle body such as the roof is painted a different color, this requires masking the first coating and then passing the vehicle body through the paint spray process a second time to add the second color. After this second paint operation the masking must be removed. This is both time-consuming and labor-intensive adding significant cost to the operation.

A second disadvantage of the current spraying technology is that the drops of paint are sprayed in a wide jet of droplets which has a wide range of droplet sizes. As a result many of the droplets do not land on the vehicle, either because they are sprayed near the edges and so overspray the substrate, or because the smaller droplets have too low a momentum to reach the vehicle body. This excess overspray must be removed from the spray operation and disposed of safely leading to significant waste and also additional cost.

Applying coatings using a high transfer efficiency applicator may provide a solution for applying two colors to a vehicle and for minimizing overspray by generating drops of a uniform size that can be directed to a specific point on the substrate, e.g. a specific location the vehicle body, thus minimizing, or completely eliminating oversprayed droplets. In addition, digital printing can be used to print patterns or two tones on a vehicle body, either as a second color digitally printed on the top of a previously sprayed basecoat of a different color, or directly onto the primed or clear-coated vehicle substrate.

However, conventional inkjet inks have typically been formulated to print on porous substrates such as paper and textiles where the ink is rapidly absorbed into the substrate thus facilitating drying and handling of the substrate shortly after printing. In addition, although the printed articles have sufficient durability for these applications, such as printed text and pictures, or patterned fabrics, the durability requirements of an automotive coating are far greater in terms of both physical durability, such as resistance to abrasion and chipping, and long-term durability to weathering and light resistance. Furthermore, ink jet inks known in the art are formulated to have a low and generally shear-rate independent, or Newtonian, viscosity, typically below 20 cps. This is because of the limited amount of energy available in each nozzle of a printhead to eject a drop and also to avoid thickening of the ink in the channels of the printhead potentially leading to clogging.

By contrast, an automotive coating typically has significant non-Newtonian shear behavior with extremely high viscosity at low-shear to help avoid pigment settling and to ensure rapid and even set-up of the coating immediately after application, but relatively low viscosity at high shear rates to facilitate spraying and atomization of the spray into droplets.

Moreover, even if incumbent technology is suitable for use in some horizontal surface applications, other applications remain, such a vertical surface applications, wherein the incumbent technology sags to unacceptable levels. Since high transfer efficiency applications demand very low viscosity without any shear thinning behavior, standard approaches for imparting sag resistance for spray applied coatings cannot be employed. Accordingly, there remains opportunity for improvement.

BRIEF SUMMARY

This disclosure provides a method of applying a one-component waterborne coating composition to a substrate utilizing a high transfer efficiency applicator to form a coating layer disposed on the substrate, the method comprising the steps of:
  providing the coating composition to the high transfer efficiency applicator; and
  applying the coating composition to the substrate through the high transfer efficiency applicator to form the coating layer on the substrate wherein a loss of volatiles after application through the high transfer efficiency applicator is less than about 0.5 weight percent actives based on a total weight of the coating composition,
  wherein the coating composition has a pH of greater than about 7 and comprises:
    A. a resin dispersion comprising a latex, a polyurethane, or combinations thereof;
    B. an optional cross-linker;
    C. an optional pigment;
    D. water;

E. a water-soluble solvent; and

F. at least one rheology control agent chosen from an alkali swellable emulsion, a layered silicate, and combinations thereof;

wherein the coating composition has a viscosity of about 20 to about 100 cps as determined using ASTM 7867-13 with cone-and-plate or parallel plates at a shear rate of 1000 sec-1, and wherein the coating composition has a wet film thickness of at least 20 microns measured at about 45 degrees without visible sag.

DETAILED DESCRIPTION

The following detailed description is merely exemplary in nature and is not intended to limit the instant method. Furthermore, there is no intention to be bound by any theory presented in the preceding background or the following detailed description.

Embodiments of the present disclosure are generally directed to one-component waterborne coating compositions and methods for forming and applying the same. For the sake of brevity, conventional techniques related to forming one-component waterborne coating compositions may not be described in detail herein. Moreover, the various tasks and process steps described herein may be incorporated into a more comprehensive procedure or process having additional steps or functionality not described in detail herein. In particular, various steps in the manufacture of one-component waterborne coating compositions are well-known and so, in the interest of brevity, many conventional steps will only be mentioned briefly herein or will be omitted entirely without providing the well-known process details.

This disclosure provides a method of applying a one-component waterborne coating composition to a substrate utilizing a high transfer efficiency applicator to form a coating layer disposed on the substrate, the method comprising the steps of:

providing the coating composition to the high transfer efficiency applicator; and applying the coating composition to the substrate through the high transfer efficiency applicator to form the coating layer on the substrate wherein a loss of volatiles after application through the high transfer efficiency applicator is less than about 0.5 weight percent actives based on a total weight of the coating composition, wherein the coating composition has a pH of greater than about 7 and comprises:

A. a resin dispersion comprising a latex, a polyurethane, or combinations thereof;

B. an optional cross-linker;

C. an optional pigment;

D. water;

E. a water-soluble solvent; and

F. at least one rheology control agent chosen from an alkali swellable emulsion, a layered silicate, and combinations thereof;

wherein the coating composition has a viscosity of about 20 to about 100 cps as determined using ASTM 7867-13 with cone-and-plate or parallel plates at a shear rate of 1000 sec-1, and wherein the coating composition has a wet film thickness of at least 20 microns measured at about 45 degrees without visible sag.

Providing the One-Component Waterborne Coating Composition:

The method includes the step of providing the coating composition to the high transfer efficiency applicator. The step of providing is not particularly limited and may be any known in the art. For example, the step of providing may be describe as providing one or more components of the composition, in whole or in part, combining these components to form the composition, and then providing the completed composition. Alternatively, the step of providing may be describe as pumping, flowing, moving, or otherwise delivering one or more components of the composition or the composition as a whole to the high transfer efficiency applicator. The step of providing may be described as a continuous process or a batch process. Similarly, the step of providing may include continuous sub-steps and/or batch sub-steps. In various embodiments, the step of providing is described as pumping the composition to the applicator under pressure. The step of providing may be as understood by one of skill in the art.

Applying the One-Component Waterborne Coating Composition:

The method also includes the step of applying the coating composition to the substrate through the high transfer efficiency applicator to form the coating layer on the substrate. The step of applying is not particularly limited. In various embodiments, the step of applying is further defined as jetting, e.g. jetting through the high transfer efficiency applicator. Alternatively, the step of applying may be further defined as printing.

Typically, the step of applying is further defined as jetting or printing through, with, or by, the high transfer efficiency applicator. During the step of applying, a loss of volatiles after application through the high transfer efficiency applicator is less than about 0.5 weight percent actives based on a total weight of the coating composition. In various embodiments, this amount is less than about 0.4, 0.3, 0.2, or 0.1, weight percent actives based on a total weight of the coating composition. Typically, the terminology "volatiles" is defined as substances which will evaporate thereby resulting in a weight loss of the coating composition. Loss of volatiles after application would be determined by the increase in % solids after over before application where % solids in each case would be determined by gravimetrically by ASTM D2369-10, In various non-limiting embodiments, all values and ranges of values, both whole and fractional, including and between the aforementioned values, are hereby expressly contemplated for use herein.

In certain embodiments, the step of applying produces droplets of the coating composition that impact the substrate. In various embodiments, at least about 99.5, 99.6, 99.7, 99.8, 99.9, or even higher, % of the droplets of the coating composition expelled from the high transfer efficiency applicator contact the substrate. Without being bound by theory, it is believed that an increase in the number of droplets contacting the substrate relative to the number of droplets that do not contact the substrate thereby entering the environment, improves efficiency of application of the coating composition, reduces waste generation, and reduces maintenance.

In various embodiments, at least about 99.5, 99.6, 99.7, 99.8, 99.9, or even higher, % of the droplets of the coating composition expelled from the high transfer efficiency applicator are monodispersed such that the droplets have a particle size distribution of less than about 20%, alternatively less than about 15%, alternatively less than about 10%, alternatively less than about 5%, alternatively less than 3%, alternatively less than 2%, alternatively less than 1%, or alternatively less than about 0.1%. While conventional applicators rely on atomization to form "a mist" of atomized droplets of a coating composition having a dispersed particle size distribution, the monodispersed droplets and/or streams formed by the high transfer efficiency applicator can be directed to the substrate thereby resulting in an improved transfer efficiency relative to conventional applicators. In various non-limiting embodiments, all values and ranges of values, both whole and fractional, including and between the aforementioned values, are hereby expressly contemplated for use herein.

In various embodiments, at least about 99.5, 99.6, 99.7, 99.8, 99.9, or even higher, % of the droplets of the coating composition expelled from the high transfer efficiency applicator remain as a single droplet after expulsion from the high transfer efficiency applicator. Without being bound by theory, it is believed that the formation of satellite droplets can be reduced or eliminated by applying the coating composition utilizing the high transfer efficiency applicator. Satellite droplet formation may be reduced by considering the impact velocity and the nozzle diameter. In various non-limiting embodiments, all values and ranges of values, both whole and fractional, including and between the aforementioned values, are hereby expressly contemplated for use herein.

In various embodiments, liquid paint is ejected from one or more nozzles of the high transfer efficiency applicator in an engineered/controlled fashion that creates a fine stream, that may or may not breakup into droplets. This stream is targeted to the substrate such that drops arrive at specific locations to potentially form a continuous film or pattern on the subject. As a result, in many embodiments, there is essentially no overspray (drops missing their target) and nearly 100% transfer efficiency (all paint goes to targeted location on the substrate.) As will be appreciated by one of skill in the art, some allowance is made for start-up and stopping the high transfer efficiency applicator. Devices of this type can be described as drop-on-demand, stream-on demand, overspray-free, or ultra-high transfer efficiency applicators. These devices are different from spray atomization devices and techniques wherein energy, such as pneumatic, hydraulic, or centrifugal, energy, is introduced to create a partially controlled, random distribution of droplet sizes, trajectories and speeds, and wherein some additional mechanism, e.g. electrostatics and or shaping air, then guides a paint droplet cloud to a substrate. Relative to traditional paint spray, there is always some overspray and transfer efficiency loss.

The high transfer efficiency applicator itself may be any known in the art. For example, in various embodiments, the applicator is as described in one or more of patent numbers US20150375258A1, US20040217202 A1, US 2009/0304936 A1, U.S. Pat. No. 7,824,015 B2, U.S. Pat. No. 8,091,987 B2, WO 2018/206309 A1, each of which are expressly incorporated herein in their entirety for use in various non-limiting embodiments. The applicator may be alternatively described as a print head.

In one embodiment, the high transfer efficiency applicator includes a nozzle that defines a nozzle orifice and may have a nozzle diameter of from about 0.00002 m to about 0.0004 m. In another embodiment, the applicator may be fluidly connected to a reservoir configured to contain the coating composition. For example, the high transfer efficiency applicator may be configured to receive the coating composition from the reservoir and configured to expel the coating composition through the nozzle orifice to the substrate to form a coating layer. It is to be appreciated that ranges for the nozzle diameter, viscosity, density, surface tension, and relaxation time may be defined by any of the ranges described herein or any known in the art. In various non-limiting embodiments, all values and ranges of values, both whole and fractional, including and between the aforementioned values, are hereby expressly contemplated for use herein.

The high transfer efficiency applicator may be configured to expel the coating composition through the nozzle orifice at an impact velocity of from about 0.2 m/s to about 20 m/s. Alternatively, the high transfer efficiency applicator may be configured to expel the coating composition through the nozzle orifice at an impact velocity of from about 0.4 m/s to about 10 m/s. The nozzle orifice may have a nozzle diameter of from about 0.00004 m to about 0.00025 m. The coating composition may be expelled from the high transfer efficiency applicator as a droplet having a particle size of at least 10 microns. In various non-limiting embodiments, all values and ranges of values, both whole and fractional, including and between the aforementioned values, are hereby expressly contemplated for use herein.

It is contemplated that one, two, three, or even more applicators may be used in conjunction with each other. Each of the applicators may independently be as described herein or may be any known in the art.

In various embodiments, the high transfer efficiency applicator includes a plurality of nozzles with each of the nozzles defining a nozzle orifice. The plurality of the nozzles may be arranged in a linear configuration relative to one another along a first axis. For example, in various embodiments, the plurality of the nozzles includes a nozzle A and a nozzle B adjacent the nozzle A. The nozzle A and the nozzle B can be spaced from each other in a nozzle distance. The high transfer efficiency applicator distance from the substrate can be substantially the same as the nozzle distance.

In one embodiment, the plurality of the nozzles are spaced relative to each other to form a rectangular array and wherein the plurality of the nozzles can be configured to alternate expelling of the coating composition between adjacent nozzles of the rectangular array to reduce sag of the coating composition.

In various embodiments, the high transfer efficiency applicator includes fifty nozzles aligned along a y-axis. However, it is to be appreciated that an applicator can include any number of nozzles. Each nozzle may be actuated independent of the other nozzles to apply the coating composition to the substrate. During jetting, independent actuation of the nozzles can provide control for placement of each of the droplets of the coating composition on the substrate.

Two or more applicators may be coupled together to form a print head assembly. In certain embodiments, the applicators are aligned together such that the y-axis of each of the applicators are parallel to the other y-axes. Further, the nozzles of each of the applicators may be aligned with each other along an x-axis, which is perpendicular to the y-axis, such that an "array" is formed. One nozzle may be equally spaced from the other nozzles directly adjacent the one nozzle, relative to the x-axis and the y-axis. This configuration of nozzles may be suitable for applying the same coating composition by each of the applicators to the substrate as the print head assembly moves along the x-axis. Without being bound by theory, it is believed that equal spacing of the nozzles, relative to both the x-axis and the y-axis, may result in uniform application of the same coating composition on the substrate. Uniform application of the same coating composition may be suitable for single-color applications, two-tone color applications, and the like.

Alternatively, one set of nozzles along a first y-axis may be closely spaced to another set of nozzles relative to the spacing of each of the nozzles along the y-axis of a single high transfer efficiency applicator. This configuration of nozzles may be suitable for applying different coating compositions by each of the high transfer efficiency applicators to the substrate. Different coating compositions utilized within the same high transfer efficiency applicator assembly may be suitable for logos, designs, signage, striped, camouflage appearance, and the like.

The nozzles of the high transfer efficiency applicator may have any configuration known in the art, such as linear, concave relative to the substrate, convex relative to the substrate, circular, and the like. Adjustment of the configuration of the nozzles may be necessary to facilitate cooperation of the high transfer efficiency applicator to substrates having irregular configurations, such as vehicles including mirrors, trim panels, contours, spoilers, and the like.

The high transfer efficiency applicator may be configured to blend individual droplets to form a desired color. The high transfer efficiency applicator may include nozzles to apply cyan coating compositions, magenta coating compositions, yellow coating compositions, and black coating compositions. The properties of coating compositions may be modified to promote blending. Further, agitation sources, such as air movement or sonic generators may be utilized to promote blending of the coating compositions. The agitation sources may be coupled to the high transfer efficiency applicator or separate therefrom.

Identifying suitable properties of the coating composition for use in the high transfer efficiency applicator may be dependent on properties of the high transfer efficiency applicator. Properties of the high transfer efficiency applicator may include, but are not limited to, nozzle diameter of the high transfer efficiency applicator, impact velocity of the coating composition by the high transfer efficiency applicator, speed of the high transfer efficiency applicator, distance of the high transfer efficiency applicator from the substrate, droplet size of the coating composition by the high transfer efficiency applicator, firing rate of the high transfer efficiency applicator, and orientation of the high transfer efficiency applicator relative to the force of gravity.

In embodiments, the substrate is a vehicle, automobile, or automobile vehicle. A "vehicle" or "automobile" or "automobile vehicle" includes an automobile, such as, car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport. The coating composition may also be utilized to coat substrates in industrial applications such as buildings; fences; ceramic tiles; stationary structures; bridges; pipes; cellulosic materials (e.g., woods, paper, fiber, etc.). The coating composition may also be utilized to coat substrates in consumer products applications such as helmets; baseball bats; bicycles; and toys. It is to be appreciated that the term "substrate" as utilized herein can also refer to a coating layer disposed on an article that is also considered a substrate.

Various substrates may include two or more discrete portions of different materials. For example, vehicles can include metal-containing body portions and plastic-containing trim portions. Due to the bake temperature limitations of plastics (80° C.) relative to metals (140° C.), the metal-containing body portions and the plastic-containing trim portions may be conventionally coated in separate facilities thereby increasing the likelihood for mismatched coated parts. A coating composition suitable for plastic substrates may be applied to the plastic substrates by the high transfer efficiency applicator after application and bake of the coating composition suitable for metal substrates without the need for masking the substrate and wasting a portion of the coating composition through low-transfer efficiency application methods, such as conventional spray atomization. The coating composition suitable for plastic substrates may be applied using a first high transfer efficiency applicator and the coating composition suitable for metal substrates may be applied using a second high transfer efficiency applicator. The first high transfer efficiency applicator and the second high transfer efficiency applicator may form a high transfer efficiency applicator assembly.

One-Component Waterborne Coating Composition:

The one-component waterborne coating composition itself is not particularly limited and may be any known in the art that includes the components described herein. For example, this composition may be described as a "1K" composition that does not require a hardener, catalyst or activator to cure. For example, this composition may cure via exposure to air.

Throughout this disclosure, the terminology "consisting essentially of" or "consist essentially of" may describe embodiments that are free of any alternative monomers, polymers, additives, reactants, fillers, solvents, etc., as determined by one of skill in the art. The terminology "free of" may be described as including less than 10, 9, 8, 7, 6, 5, 4, 3, 2, 1, 0.5, or 0.1, weight percent of the element at issue based on a total weight of the composition. In various non-limiting embodiments, all values and ranges of values, both whole and fractional, including and between the aforementioned values, are hereby expressly contemplated for use herein.

The composition is a one-component waterborne coating composition that has a pH of greater than about 7. In various embodiments, the pH is about 7 to about 14, about 7.5 to about 13.5, about 8 to about 13, about 8.5 to about 12.5, about 9 to about 12, about 9.5 to about 11.5, about 10 to about 11, or about 10.5 to about 11. In other embodiments, the pH is about 8 to about 12, about 8 to about 11, about 8 to about 10, or about 8 to about 9. In various non-limiting embodiments, all values and ranges of values, both whole and fractional, including and between those set forth above are hereby expressly contemplated for use herein.

In various embodiments, the composition is, includes, consists essentially of, or consists of: a resin dispersion comprising a latex, a polyurethane, or combinations thereof; an optional cross-linker; an optional pigment; water; a water-soluble solvent; and at least one rheology control agent chosen from an alkali swellable emulsion, a layered silicate, and combinations thereof. For example, the terminology "consists essentially of" may describe embodiments that are free from resins or polymers not described herein or described herein as optional, cross-linkers not described herein or described herein as optional, pigments not described herein or described herein as optional, water-soluble solvents not described herein or described herein as optional, and rheology control agents not described herein or described herein as optional. The terminology "free of" or "free from" may be describe that the composition includes less than about 10, 9, 8, 7, 6, 5, 4, 3, 2, 1, 0.5, or 0.1, weight percent, e.g. weight percent actives, of that compound based on a total weight of the composition. Alternatively, the terminology "free of" or "free from" may be describe that the composition is entirely free from the compound.

Typically, the weight percents of any component described herein refer to weight percent "actives" and not a total weight percent of a component that may include a solvent such as water. However, it is contemplated that the weight percent may refer to a total weight of a component including any solvent, such as water. Some components may be approximately 100% actives such that a weight percent actives and a total weight percent of the component would be approximately the same, as understood by those of skill in the art.

Resin Dispersion

The composition includes a resin dispersion that may be, include, consist essentially of, or consist of, a latex, a polyurethane, or combinations thereof. For example, the terminology "consist essentially of" may describe embodiments that are free of a latex, polyurethane, or any other polymer known in the art, wherein "free of" is as described above. The dispersion itself is a system in which distributed particles of one material are dispersed in a continuous phase of another material. The two phases may be in the same or different states of matter. Alternatively, the resin dispersion may be described as an emulsion which is a uniform mixture of two immiscible liquids. In the instant disclosure, the latex may include a polymer which may be a dispersed phase in a liquid continuous phase such as a water. Moreover, the polyurethane may be a dispersed or liquid continuous phase. Alternatively, combinations of the above may be used. If an emulsion, the emulsion may be any type known in the art, e.g. an o/w emulsion, w/o emulsion, etc. In various embodiments, water, a water-soluble co-solvent, such as any described herein, or a combination of water and one or more of such solvents can be used as a continuous phase wherein a dispersed phase may be the latex, the polyurethane, or combinations thereof.

In various embodiments, the resin dispersion is present in an amount of from about 1 to about 50, about 1 to about 45, about 1 to about 35, about 1 to about 30, about 1 to about 25, about 1 to about 20, about 1 to about 15, about 1 to about 10, about 1 to about 5, about 5 to about 50, about 10 to about 45, about 15 to about 40, about 20 to about 35, about 25 to about 30, about 15 to about 20, about 15 to about 25, about 15 to about 30, about 10 to about 20, about 10 to about 25, about 10 to about 30, about 10 to about 35, about 18 to about 22, about 18 to about 20, about 16 to about 20, about 16 to about 22, about 16 to about 24, etc., weight percent actives based on a total weight of the composition. In various non-limiting embodiments, all values and ranges of values, both whole and fractional, including and between the aforementioned values, are hereby expressly contemplated for use herein.

Latex:

It is contemplated that zero, one, two, three, four, five, or even more individual latexes may be used in the composition. In various embodiments, the terminology "latex" means a dispersion of polymer particles in water. For example, a latex polymer typically requires a secondary dispersing agent (e.g., a surfactant) for creating a dispersion or emulsion of polymer particles in water. The latex is not particularly limited and may be any known in the art.

In various embodiments, the latex may be, include, consist essentially of, or consist of the reaction product of one or more of the following monomers to form a polymer which may be a dispersed phase and/or a continuous phase. These monomers may include, but are not limited to, (meth)acrylamide, N-substituted (meth)acrylamide, octyl(meth) acrylate, nonylphenol ethoxylate(meth)acrylate, isononyl (meth)acrylate, 1,6-hexanediol(meth)acrylate, isobornyl (meth)acrylate, 2-(2-ethoxyethoxy)ethyl(meth)acrylate, 2-ethylhexyl(meth)acrylate, lauryl(meth)acrylate, beta-carboxyethyl(meth)acrylate, isobutyl(meth)acrylate, cycloaliphatic epoxide, alpha-epoxide, 2-hydroxyethyl(meth)acrylate, (meth)acrylonitrile, maleic anhydride, itaconic acid, isodecyl(meth)acrylate, dodecyl(meth)acrylate, n-butyl (meth)acrylate, methyl(meth)acrylate, hexyl(meth)acrylate, (meth)acrylic acid, N-vinylcaprolactam, stearyl(meth)acrylate, hydroxy functional caprolactone ester(meth)acrylate, octodecyl(meth)acrylate, isooctyl(meth)acrylate, hydroxyethyl(meth)acrylate, hydroxymethyl(meth)acrylate, hydroxypropyl(meth)acrylate, hydroxyisopropyl(meth) acrylate, hydroxybutyl(meth)acrylate, hydroxyisobutyl (meth)acrylate, tetrahydrofurfuryl(meth)acrylate, combinations of these, and the like.

In other embodiments, the latex may be, include, consist essentially of, or consist of one or more of (meth)acrylated urethanes (i.e., urethane(meth)acrylates), (meth)acrylated epoxies (i.e., epoxy (meth)acrylates), (meth)acrylated polyesters (i.e., polyester(meth)acrylates), (meth)acrylated (meth)acrylics, (meth)acrylated silicones, (meth)acrylated amines, (meth)acrylated amides; (meth)acrylated polysulfones; (meth)acrylated polyesters, (meth)acrylated polyethers (i.e., polyether (meth)acrylates), vinyl(meth) acrylates, and (meth)acrylated oils.

In one embodiment, the resin dispersion may be, include, consist essentially of, or consist of, a polyester-modified acrylic dispersion containing epoxy groups. One non-limiting example has a trade name of Daotan® VTW 1686/40WA which is commercially available from Allnex.

In another embodiment, the resin dispersion may be, include, consist essentially of, or consist of, a styrene-acrylic latex dispersion. This dispersion may be formed by a two-step emulsion polymerization process.

In one embodiment, the resin dispersion may be, include, consist essentially of, or consist of, the latex. In various embodiments, the latex is present in an amount of from about 1 to about 100, about 5 to about 95, about 10 to about 90, about 15 to about 85, about 20 to about 80, about 25 to about 75, about 30 to about 70, about 35 to about 65, about 40 to about 60, about 45 to about 55, or about 50 to about 55, weight percent actives based on a total weight of the dispersion. In other embodiments, the latex (e.g. individually or as a whole) is present in an amount of from about 1 to about 50, about 1 to about 45, about 1 to about 35, about 1 to about 30, about 1 to about 25, about 1 to about 20, about 1 to about 15, about 1 to about 10, about 1 to about 5, about 5 to about 50, about 10 to about 45, about 15 to about 40, about 20 to about 35, about 25 to about 30, about 15 to about 20, about 15 to about 25, about 15 to about 30, about 10 to about 20, about 10 to about 25, about 10 to about 30, about 10 to about 35, about 18 to about 22, about 18 to about 20, about 16 to about 20, about 16 to about 22, about 16 to about 24, etc., weight percent actives based on a total weight of the composition. In other embodiments, the latex (either individually or as a whole) is present in an amount of from about 1 to about 30, about 3 to about 30, about 3 to about 25, 1 to about 20, about 2 to about 19, about 3 to about 18, about 4 to about 17, about 5 to about 16, about 6 to about 15, about 7 to about 14, about 8 to about 13, about 9 to about 12, about 10 to about 11, or about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30, weight percent actives based on a total weight of the composition. In various non-limiting embodiments, all values and ranges of values, both whole and fractional, including and between the aforementioned values, are hereby expressly contemplated for use herein.

Polyurethane:

The resin dispersion may also be, include, consist essentially of, or consist of, the polyurethane. It is contemplated that zero, one, two, three, four, five, or even more individual polyurethanes may be used in the composition. The polyurethane is not particularly limited and may be any known in the art. In various embodiments, the polyurethane is the reaction product of a polyol and an isocyanate.

In various embodiments, the polyol is chosen from polyester polyols, polyether polyols, and polycarbonate polyols. It is also contemplated that polythioether polyols, polycaprolactones, and acrylic polyols may also be utilized. In one embodiment, the polyol is further defined as a polyester polyol. In another embodiment, the polyol is a polyester polyol. In another embodiment, the polyol, is an aromatic polyester or polyether polyol.

The polyol may be derived from a reaction of an initiator and an alkylene oxide. The initiator may include any initiator known in the art. In various embodiment, the initiator is chosen from ethylene glycol, propylene glycol, dipropylene glycol, trimethylene glycol, butane diols, pentane diols, hexane diols, heptane diols, glycerol, 1,1,1-trimethylolpropane, 1,1,1-trimethylolethane, hexane triols, alkyl glucosides, pentaerythritol, sorbitol, diamine naphthalenes, anilines, condensation products of aniline and formaldehyde, alkyl amines, triisopropanolamine, alkylene diamines, diamine alkanes, sucrose, toluene diamine, and combinations thereof.

The alkylene oxide that reacts with the initiator to form the polyol may be chosen from ethylene oxide, propylene oxide, butylene oxide, amylene oxide, tetrahydrofuran, alkylene oxide-tetrahydrofuran mixtures, epihalohydrins, aralkylene oxides, and combinations thereof. In various embodiments, the alkylene oxide is chosen from ethylene oxide, propylene oxide, and combinations thereof. However, it is also contemplated that any suitable alkylene oxide that is known in the art may be used.

The polyol may include an organic functional group chosen from a carboxyl group, an amine group, a carbamate group, an amide group, and an epoxy group. The polyol may also include an alkylene oxide cap. If the polyol includes the alkylene oxide cap, the alkylene oxide cap typically includes, but is not limited to, ethylene oxide, propylene oxide, butylene oxide, amylene oxide, and combinations thereof. More typically, the alkylene oxide cap includes ethylene oxide. If the polyol includes the alkylene oxide cap, the alkylene oxide cap may be less than or equal to 25, and more typically of from 10 to 20, percent by weight based on the total weight of the polyol. In various non-limiting embodiments, all values and ranges of values, both whole and fractional, including and between the aforementioned values, are hereby expressly contemplated for use herein.

In various embodiments, the polyol has a number average molecular weight of from 200 to 10,000 g/mol, a hydroxyl number of from 10 to 1,000 mg KOH/g, and a nominal functionality of from 1 to 8. In various embodiments, the polyol also typically has a viscosity from 20 to 50,000 centipoises at 77° F. In various non-limiting embodiments, all values and ranges of values, both whole and fractional, including and between the aforementioned values, are hereby expressly contemplated for use herein.

The polyol may also include an addition polymer dispersed therein. More specifically, the polyol may include a dispersion or a solution of addition or condensation polymers, i.e., a graft polyol. The dispersion may include styrene, acrylonitrile, and combinations thereof. Also, the polyol may also include an emulsion that includes water or any other polar compound known in the art.

Alternatively, the polyurethane may be described as the reaction product of a compound having one or more hydroxyl groups (e.g. a monol, diol, triol, tetrol, or polyol) and an isocyanate. Non-limiting suitable compounds include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, polyethylene glycol and polypropylene glycol. If desired, monohydric alcohols, such as, for example, butanol, octanol, lauryl alcohol, ethoxylated or propoxylated phenols may also be included along with polyhydric alcohols to control molecular weight.

In certain embodiments, low molar mass polyols defined by an empirical and structural formula, such as polyhydric alcohols are utilized to form the polyurethane. Non-limiting examples of polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, polyethylene glycol and polypropylene glycol. In other embodiments, oligomeric or polymeric polyols with number-average molar masses of, for example, up to 8000, alternatively up to 5000, alternative up to 2000, and/or, for example, corresponding hydroxyl-functional polyethers, polyesters or polycarbonates are utilized. In various non-limiting embodiments, all values and ranges of values, both whole and fractional, including and between the aforementioned values, are hereby expressly contemplated for use herein.

An isocyanate may also be reacted with a hydroxyl-functional resin that is not particularly limited and may be any known in the art. In various embodiments, this resin may be, include, consist essentially of, or consist of, aliphatic or aromatic dicarboxylic acids, polyols, diols, aromatic or aliphatic cyclic anhydrides and cyclic alcohols. Non-limiting examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic, and cyclobutanetetracarboxylic acid. The cycloaliphatic polycarboxylic acids can be used not only in their cis but also in their trans form and as a mixture of both forms. Further non-limiting examples of suitable polycarboxylic acids can include aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid. Combinations of polyacids, such as a combination of polycarboxylic acids and cycloaliphatic polycarboxylic acids can be suitable. Combinations of polyols can also be suitable.

Non-limiting suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, polyethylene glycol and polypropylene glycol. If desired, monohydric alcohols, such as, for example, butanol, octanol, lauryl alcohol, ethoxylated or propoxylated phenols may also be included along with polyhydric alcohols. Alternatively, low molar mass polyols defined by an empirical and structural formula, such as polyhydric alcohols can be utilized. In other embodiments, oligomeric or polymeric polyols with number-average molar masses of, for example, up to 8000, alternatively up to 5000, alternative up to 2000, and/or, for example, corresponding hydroxyl-functional polyethers, polyesters or polycarbonates are utilized. In various non-limiting embodiments, all values and ranges of values, both whole and fractional, including and between the aforementioned values, are hereby expressly contemplated for use herein.

The resin dispersion may also include an amine, which may be any type known in the art, that may or may not react with an isocyanate to form a polyurea. The amine may include, but is not limited to, primary and secondary amines aliphatic and/or cyclic aliphatic amines. The amine may include any additional functional group known in the art including, but not limited to, hydroxyl groups, thiol groups, alkyl groups, cyclic groups, aromatic groups, and combinations thereof. It is to be understood that the amine may also include an amide which also may be any type known in the art. The amide may include, but is not limited to, polyester amides obtained from polymers of unsaturated or saturated carboxylic acids or anhydrides, and multifunctional unsaturated or saturated amino-alcohols, and combinations thereof.

Referring back to the isocyanate, the isocyanate is not particularly limited and may be any described in this disclosure. In various embodiment, the isocyanate includes at least one isocyanate and may include more than one isocyanate. The isocyanate may be, include, consist essentially of, or consist of an aromatic isocyanate, an aliphatic isocyanate, and/or combinations thereof. In one embodiment, the isocyanate is or includes an aromatic isocyanate such as polymeric MDI. If the isocyanate is or includes an aromatic isocyanate, the aromatic isocyanate typically corresponds to the formula R' $(NCO)_z$ wherein R' is a polyvalent organic radical which is aromatic and z is an integer that corresponds to the valence of R'. Typically, z is at least two.

In various embodiments, isocyanate may be, include, consist essentially of, or consist of 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, and 3,3'-dimethyldiphenylmethane-4,4'-diisocyanate, triisocyanates such as 4,4',4''-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof.

If the isocyanate is or includes an aromatic isocyanate, the isocyanate may be, include, consist essentially of, or consist of a modified multivalent aromatic isocyanate, i.e., a product which is obtained through chemical reactions of aromatic diisocyanates and/or aromatic polyisocyanates. Examples include polyisocyanates including, but not limited to, ureas, biurets, allophanates, carbodiimides, uretonimines, and isocyanurate and/or urethane groups including diisocyanates and/or polyisocyanates such as modified diphenylmethane diisocyanates. The urethane groups of the isocyanate may be formed through reaction of a base isocyanate, as described above, with low molecular weight diols, triols, dialkylene glycols, trialkylene glycols, polyoxyalkylene glycols with a number average molecular weight of up to 1500 g/mol, diethylene glycol, dipropylene glycol, polyoxyethylene glycol, polyoxypropylene glycol, polyoxyethylene glycol, polyoxypropylene glycol, and/or polyoxypropylene polyoxyethylene glycols or -triols, and combinations thereof. The isocyanate may also include one or more prepolymers including isocyanate groups.

The isocyanate may be, include, consist essentially of, or consist of modified benzene and toluene diisocyanates, employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof. In various embodiments, the isocyanate may be, include, consist essentially of, or consist of an isocyanate that is chosen from 2,4'-diphenylmethane diisocyanate, 4,4'-diphenylmethane diisocyanate, modified 2,4'-diphenylmethane diisocyanate, modified 4,4'-diphenylmethane diisocyanate, and combinations thereof. The isocyanate composition may also include stoichiometric or non-stoichiometric reaction products of the aforementioned isocyanates.

Alternatively, the isocyanate may be, include, consist essentially of, or consist of a liquid polyisocyanate including one or more carbodiimide groups. In various embodiments, crude polyisocyanates may also be used, such as crude toluene diisocyanate obtained by the phosgenation of a mixture of toluenediamines or crude diphenylmethane isocyanate obtained by the phosgenation of crude isocyanates.

The isocyanate is not limited in NCO content and typically has an NCO content of from 5 to 35 percent by weight. Determination of the NCO content on percent by weight is accomplished by a standard chemical titration analysis known to those skilled in the art. In various non-limiting embodiments, all values and ranges of values, both whole and fractional, including and between the aforementioned values, are hereby expressly contemplated for use herein.

In still other embodiments, non-limiting examples of suitable polyisocyanates include aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of two molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanate. Other polyisocyanates disclosed herein can also be suitable for producing polyurethanes.

Other polyurethanes can be made by first forming an NCO-functional hydrophilic polyurethane prepolymer by addition reaction of polyol type compounds and polyisocyanates, conversion of the so-formed polyurethane prepolymer into the aqueous phase and then reacting the aqueously dispersed NCO-functional polyurethane prepolymer with an NCO-reactive chain extender like, for example, a polyamine, a hydrazine derivative or water.

In other embodiments, the polyurethane may be, include, consist essentially of, or consists of, a polyester-polyurethane polymer. The polyester of the polyester-polyurethane polymer may be linear or branched. Useful polyesters can include esterification products of aliphatic or aromatic dicarboxylic acids, polyols, diols, aromatic or aliphatic cyclic anhydrides and cyclic alcohols. Non-limiting examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic, and cyclobutanetetracarboxylic acid. The cycloaliphatic polycarboxylic acids can be used not only in their cis but also in their trans form and as a mixture of both forms. Further non-limiting examples of suitable polycarboxylic acids can include aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid. Combinations of polyacids, such as a combination of polycarboxylic acids and cycloaliphatic polycarboxylic acids can be suitable. Combinations of polyols can also be suitable.

Non-limiting examples of suitable polyesters include a branched copolyester polymer. The branched copolyester polymer and process for production described in U.S. Pat. No. 6,861,495, which is hereby incorporated by reference, can be suitable. Monomers with multifunctional groups such as AxBy (wherein each of x and y is independently 1 to 3) types including those having one carboxyl group and two hydroxyl groups, two carboxyl groups and one hydroxyl group, one carboxyl group and three hydroxyl groups, or three carboxyl groups and one hydroxyl group can be used to create branched structures. Non-limiting examples of such monomers include 2,3 dihydroxy propionic acid, 2,3 dihydroxy 2-methyl propionic acid, 2,2 dihydroxy propionic acid, 2,2-bis(hydroxymethyl) propionic acid, and the like.

The branched copolyester polymer can be conventionally polymerized from a monomer mixture containing a chain extender chosen from a hydroxy carboxylic acid, a lactone of a hydroxy carboxylic acid, and a combination thereof; and one or more branching monomers. Some of the suitable hydroxy carboxylic acids include glycolic acid, lactic acid, 3-hydroxypropionic acid, 3-hydroxybutyric acid, 3-hydroxyvaleric acid, and hydroxypyvalic acid. Some of the suitable lactones include caprolactone, valerolactone; and lactones of the corresponding hydroxy carboxylic acids, such as, e.g., 3-hydroxypropionic acid, 3-hydroxybutyric acid, 3-hydroxyvaleric acid, and hydroxypyvalic acid. In certain embodiments, caprolactone can is utilized. In embodiments, the branched copolyester polymer can be produced by polymerizing, in one step, the monomer mixture that includes the chain extender and hyper branching monomers, or by first polymerizing the hyper branching monomers followed by polymerizing the chain extenders. It is to be appreciated that the branched copolyester polymer can be formed from acrylic core with extending monomers described above.

The polyester-polyurethane polymer can be produced from the polyester and polyisocyanates. The polyester can be polymeric or oligomeric organic species with at least two hydroxyl-functionalities or two-mercapto functionalities and their mixtures thereof. Polyesters and polycarbonates with terminal hydroxy groups can be effectively used as the diols.

One non-limiting example of a polyester-polyurethane polymer is a polyurethane dispersion resin formed from a linear polyester diol resin (reaction product of monomers 1,6-hexanediol, adipic acid, and isophthalic acid) and isophorone diisocyanate. This polyester-polyurethane polymer has a weight average molecular weight of about 30,000, a solids content of about 35 wt %, and a particle size (e.g. Dv50) of about 250 nanometers, as determined using any apparatus known in the art, e.g. a Malvern Mastersizer.

Another non-limiting example of a polyester-polyurethane polymer is a polyurethane dispersion resin formed from a linear polycarbonate-polyester and isophorone diisocyanate. This polyester-polyurethane polymer has a weight average molecular weight of about 75,000, a solids content of about 35 wt %, and a particle size (e.g. Dv50) of about 180 nanometers, as determined using any apparatus known in the art, e.g. a Malvern Mastersizer.

In another embodiment, the resin dispersion may be, include, consist essentially of, or consist of, a polyurethane dispersion resin formed from a slightly branched polyester polyol and hexamethylene diisocyanate, e.g. being about 40 wt % solid.

In a further embodiment, the resin dispersion may be, include, consist essentially of, or consist of, a polyurethane dispersion resin formed from a linear polyester diol resin (e.g. that is the reaction product of monomers 1,6-hexanediol, adipic acid, and isophthalic acid) and isophorone diisocyanate, e.g. being about 35 wt % solid.

In another embodiment, the polyurethane is chosen from one formed from a branched polyester polyol and hexamethylene diisocyanate; formed from a linear polyester diol resin and isophorone diisocyanate wherein the linear polyester diol is the reaction product of 1,6-hexanediol, adipic acid, and isophthalic acid; formed from a linear polycarbonate-polyester polyol and isophorone diisocyanate; a polyester-polyurethane polymer; and combinations thereof.

In another embodiment, the resin dispersion may be, include, consist essentially of, or consist of, a polyurethane dispersion resin formed from a linear polycarbonate-polyester polyol and isophorone diisocyanate.

In still another embodiment, the resin dispersion may be, include, consist essentially of, or consist of, a polyester-polyurethane polymer having the tradename Bayhydrol® U 241 which is commercially available from Covestro AG of Leverkusen, Germany.

In one embodiment, the resin dispersion may be, include, consist essentially of, or consist of, the polyurethane. In various embodiments, the polyurethane is present in an amount of from about 1 to about 100, about 5 to about 95, about 10 to about 90, about 15 to about 85, about 20 to about 80, about 25 to about 75, about 30 to about 70, about 35 to about 65, about 40 to about 60, about 45 to about 55, or about 50 to about 55, weight percent actives based on a total weight of the dispersion. In various embodiments, this amount is from about 30 to about 50, e.g., 31, 32, 33, 34, 35, 36, 37, 38, 39, 40, 41, 42, 43, 44, 45, 46, 47, 48, 49, or 50, weight percent actives based on a total weight of the dispersion. In other embodiments, the polyurethane (e.g. individually or as a whole) is present in an amount of from about 1 to about 50, about 1 to about 45, about 1 to about 35, about 1 to about 30, about 1 to about 25, about 1 to about 20, about 1 to about 15, about 1 to about 10, about 1 to about 5, about 5 to about 50, about 10 to about 45, about 15 to about 40, about 20 to about 35, about 25 to about 30, about 15 to about 20, about 15 to about 25, about 15 to about 30, about 10 to about 20, about 10 to about 25, about 10 to about 30, about 10 to about 35, about 18 to about 22, about 18 to about 20, about 16 to about 20, about 16 to about 22, about 16 to about 24, etc., weight percent actives based on a total weight of the composition. In various embodiments, this amount is from about 1 to about 15, e.g. 1, 2, 3, 4, 5, 6, 7, 8, 9, 10, 11, 12, 13, 14, or 15, weight percent actives based on a total weight of the composition. In other embodiments, the polyurethane (either individually or as a whole) is present in an amount of from about 1 to about 20, about 2 to about 19, about 3 to about 18, about 4 to about 17, about 5 to about 16, about 6 to about 15, about 7 to about 14, about 8 to about 13, about 9 to about 12, about 10 to about 11, or about 1, 2, 3, 4, 5, 6, 7, 8, 9, 10, 11, 12, 13, 14, 15, 16, 17, 18, 19, or 20, weight percent actives based on a total weight of the composition. In various non-limiting embodiments, all values and ranges of values, both whole and fractional, including and between the aforementioned values, are hereby expressly contemplated for use herein.

Optional Cross-Linker:

The coating composition also includes an optional cross-linker. In various embodiments, this optional cross-linker may be, include, consist essentially of, or consist of, any melamine cross-linker known in the art.

Melamine resins may be partially or fully etherified with one or more alcohols like methanol or butanol. A non-limiting example is hexamethoxymethyl melamine. Non-limiting examples of suitable melamine resins include monomeric melamine, polymeric melamine-formaldehyde resin, or a combination thereof. The monomeric melamines include low molecular weight melamines which contain, on an average, three or more methylol groups etherized with a $C_1$ to $C_5$ monohydric alcohol such as methanol, n-butanol, or isobutanol per triazine nucleus, and have an average degree of condensation up to about 2 and, in certain embodiments, in the range of from about 1.1 to about 1.8, and have a proportion of mononuclear species not less than about 50 percent by weight. By contrast the polymeric melamines have an average degree of condensation of more than about 1.9. Some such suitable monomeric melamines include alkylated melamines, such as methylated, butylated, isobutylated melamines and mixtures thereof. Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327, 370 and XW3106, which are all monomeric melamines. Suitable polymeric melamines include high amino (partially alkylated, —N, —H) melamine known as Resimene® BMP5503 (molecular weight 690, polydispersity of 1.98, 56% butyl, 44% amino), which is supplied by Solutia Inc., St. Louis, Mo., or Cymel®1158 provided by Cytec Industries Inc., West Patterson, N.J. Cytec Industries Inc. also supplies Cymel® 1130@80 percent solids (degree of polymerization of 2.5), Cymel® 1133 (48% methyl, 4% methylol and 48% butyl), both of which are polymeric melamines. In various non-limiting embodiments, all values and ranges of values, both whole and fractional, including and between the aforementioned values, are hereby expressly contemplated for use herein.

The coating composition may include more than one type of crosslinker that have the same or different crosslinking-functional groups. Typical crosslinking-functional groups can include hydroxyl, thiol, isocyanate, thioisocyanate, acetoacetoxy, carboxyl, primary amine, secondary amine, epoxy, anhydride, ketimine, aldimine, orthoester, orthocarbonate, cyclic amide, or combinations thereof.

In various embodiments, the optional cross-linker, e.g. a melamine cross-linker, is utilized in an amount of from about 10 to about 30%, about 12 to about 25, or about 15% to about 20%, weight percent actives based on a total weight percent of the composition. In other embodiments, this amount is from about 10 to about 25, about 10 to about 10, about 10 to about 15, about 15 to about 30, about 15 to about 25, about 20 to about 30, or about 20 to about 25, weight percent actives based on a total weight of the composition. In other embodiments, the cross-linker is present in an amount of from about 1 to about 20, about 2 to about 19, about 3 to about 18, about 4 to about 17, about 5 to about 16, about 6 to about 15, about 7 to about 14, about 8 to about 13, about 9 to about 12, about 10 to about 11, or about 1, 2, 3, 4, 5, 6, 7, 8, 9, 10, 11, 12, 13, 14, 15, 16, 17, 18, 19, or 20, weight percent actives based on a total weight of the composition. In various non-limiting embodiments, all values and ranges of values, both whole and fractional, including and between the aforementioned values, are hereby expressly contemplated for use herein.

In exemplary embodiments, the coating composition includes a melamine-formaldehyde resin having the tradename Cymel® 303 which is commercially available from Cytec Industries Inc. of West Patterson, N.J.

Optional Isocyanate Cross-Linker:

In various embodiments, a blocked isocyanate cross-linker is not used and a melamine cross-linker is used. Alternatively, both a blocked isocyanate cross-linker and a melamine cross-linker can be used. Alternatively, a melamine cross-linker can be used to the exclusion of a blocked isocyanate cross-linker.

The composition may include, or be free of, a blocked isocyanate cross-linker. This blocked isocyanate cross-linker is not particularly limited and may be any known in the art, e.g. any described above. In various embodiments, this blocked isocyanate cross-linker may be, include, consist essentially of, or consist of, one or more isocyanates such as, but not limited to, aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of two molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanate.

In various embodiments, isocyanates such as, for example, oligomers based on hexamethylene diisocyanate (HDI), diphenylmethane diisocyanate (MDI), isophorone diisocyanate (IPDI), or toluidine diisocyanate (TDI), e.g. isocyanurates, biuret, allophanates, and adducts of the isocyanates mentioned with polyhydric alcohols and mixtures thereof can be used. These can react with polyols such as, for example, OH group-containing polyesters, polyethers, acrylates and polyurethane, and mixtures thereof, which polyols may be solvent-based, solvent-free, or water-dilutable. This blocked isocyanate cross-linker may be utilized in any amount, e.g. in an amount as described above relative to the other optional cross-linker.

Optional Pigment:

The coating composition also includes an optional pigment. Accordingly, the composition may include the pigment or be free of the pigment. Any pigment known in the art for use in coating compositions may be utilized in the coating composition. Non-limiting examples of suitable pigments include metallic oxides, metal hydroxide, effect pigments including metal flakes, chromates, such as lead chromate, sulfides, sulfates, carbonates, carbon black, silica, talc, china clay, phthalocyanine blues and greens, organo reds, organo maroons, pearlescent pigments, other organic pigments and dyes, and combinations thereof. If desired, chromate-free pigments, such as barium metaborate, zinc phosphate, aluminum triphosphate and combinations thereof, can also be utilized.

Further non-limiting examples of suitable effect pigments include bright aluminum flake, extremely fine aluminum flake, medium particle size aluminum flake, and bright medium coarse aluminum flake; mica flake coated with titanium dioxide pigment also known as pearl pigments; and combinations thereof. Non-limiting examples of suitable colored pigments include titanium dioxide, zinc oxide, iron oxide, carbon black, mono azo red toner, red iron oxide, quinacridone maroon, transparent red oxide, dioxazine carbazole violet, iron blue, indanthrone blue, chrome titanate, titanium yellow, mono azo permanent orange, ferrite yellow, mono azo benzimidazolone yellow, transparent yellow oxide, isoindoline yellow, tetrachloroisoindoline yellow, anthanthrone orange, lead chromate yellow, phthalocyanine green, quinacridone red, perylene maroon, quinacridone violet, pre-darkened chrome yellow, thio-indigo red, transparent red oxide chip, molybdate orange, molybdate orange red, and combinations thereof.

The pigment may be alternatively described as an extender pigment. While extender pigments are generally utilized to replace higher cost pigments in coating compositions, the extender pigments as contemplated herein may increase shear viscosity of the coating composition as compared to a coating composition free of the extender pigments. An increase in shear viscosity of the coating composition may improve suitability of the coating composition for application to the substrate utilizing the high transfer efficiency applicator. The extender pigment may have a particle size (e.g. Dv50 as determined using a Malvern Mastersizer) of from about 0.01 to about 44 microns. The extender pigment may have a variety of configurations including, but not limited to, nodular, platelet, acicular, and fibrous. Non-limiting examples of suitable extender pigments include whiting, barytes, amorphous silica, fumed silica, diatomaceous silica, china clay, calcium carbonate, mica, wollastonite, magnesium silicate (talc), barium sulfate, kaolin, and aluminum silicate. In various non-limiting embodiments, all values and ranges of values, both whole and fractional, including and between the aforementioned values, are hereby expressly contemplated for use herein.

The coating composition may include the extender pigment in an amount of from about 0.1 to about 50, alternatively from about 1 to about 20, or alternatively from about 1 to about 10, wt. %, based on a total weight of the coating composition. In other embodiments, the optional pigment is present in an amount of from about 1 to about 50, about 5 to about 50, about 10 to about 45, about 15 to about 40, about 20 to about 35, or about 25 to about 30, weight percent actives based on a total weight of the composition. In other embodiments, the optional pigment is present in an amount of from about 1 to about 20, about 2 to about 19, about 3 to about 18, about 4 to about 17, about 5 to about 16, about 6 to about 15, about 7 to about 14, about 8 to about 13, about 9 to about 12, about 10 to about 11, or about 1, 2, 3, 4, 5, 6, 7, 8, 9, 10, 11, 12, 13, 14, 15, 16, 17, 18, 19, or 20, weight percent actives based on a total weight of the composition. In other embodiments, the optional pigment is present in an amount of from about 0.1 to about 1, about 0.2 to about 0.9, about 0.3 to about 0.8, about 0.4 to about 0.7, about 0.5 to about 0.6, or about 0.1, 0.2, 0.3, 0.4, 0.5, 0.6, 0.7, 0.8, 0.9, or 1.0, weight percent actives based on a total weight of the composition. In various non-limiting embodiments, all values and ranges of values, both whole and fractional, including and between the aforementioned values, are hereby expressly contemplated for use herein.

In certain embodiments, the coating composition includes magnesium silicate (talc), barium sulfate, or a combination thereof. In various embodiments, inclusion of barium sulfate as the extender pigment results in a coating composition having greater shear viscosity as compared to inclusion of talc as the extender pigment. In various embodiments, the optional pigment is chosen from Pigment Yellow 213, PY 151, PY 93, PY 83, Pigment Red 122, PR 168, PR 254, PR 179, Pigment Red 166, Pigment Red 48:2, Pigment Violet 19, Pigment Blue 15:1, Pigment Blue 15:3, Pigment Blue 15:4, Pigment Green 7, Pigment Green 36, Pigment Black 7 or Pigment White 6, and combinations thereof.

Water

The composition also includes water. In various embodiments, the amount of water utilized is from about 1 to about 99, about 5 to about 95, about 10 to about 90, about 15 to about 85, about 20 to about 80, about 25 to about 75, about 30 to about 70, about 35 to about 65, about 40 to about 60, about 45 to about 55, or about 50 to about 55, weight percent actives based on a total weight of the composition. In other embodiments, the water is present in an amount of from about 40 to about 90, about 45 to about 85, about 50 to about 80, about 55 to about 75, about 60 to about 70, or about 65 to about 70, weight percent actives based on a total weight of the composition. This amount of water may describe a total amount of water in the composition or may describe an amount of water added to the composition independent from any water included in, for example, the dispersion, solvent, etc. In various non-limiting embodiments, all values and ranges of values, both whole and fractional, including and between the aforementioned values, are hereby expressly contemplated for use herein.

Water-Soluble Solvent

The composition also includes a water-soluble solvent which is not particularly limited and may be any known in the art. In various embodiments, the water-soluble solvent may be methanol, propanol, butanol, ethanol, 1,2-butanediol, 1,3-butanediol, 1,3-propanediol, 1,4-butanediol, 1,4-dioxane, 1,5-pentanediol, 2-butoxyethanol, 2-propanol, acetaldehyde, acetic acid, acetone, acetonitrile, butyric acid, diethanolamine, diethylenetriamine, dimethoxyethane, dimethyl sulfoxide, dimethylformamide, ethylamine, ethylene glycol, formic acid, furfuryl alcohol, glycerol, methyl diethanolamine, methyl isocyanide, n-methyl-2-pyrrolidone, propanoic acid, propylene glycol, pyridine, tetrahydrofuran, triethylene glycol, glycol ethers (ethylene glycol monobutyl ether, diethylene glycol monobutyl ether, etc., any and all isomers thereof, or combinations thereof. Alternatively, the composition may be free of any one or more of the aforementioned solvents so long as at least one water-soluble solvent is utilized in the composition.

In various embodiments, the water-soluble solvent is present in an amount of from about 1 to about 99, about 5 to about 95, about 10 to about 90, about 15 to about 85, about 20 to about 80, about 25 to about 75, about 30 to about 70, about 35 to about 65, about 40 to about 60, about 45 to about 55, or about 50 to about 55, weight percent actives based on a total weight of the composition. In other embodiments, the water-soluble solvent is present in an amount of from about 1 to about 50, about 1 to about 45, about 1 to about 35, about 1 to about 30, about 1 to about 25, about 1 to about 20, about 1 to about 15, about 1 to about 10, about 1 to about 5, about 5 to about 50, about 10 to about 45, about 15 to about 40, about 20 to about 35, about 25 to about 30, about 15 to about 20, about 15 to about 25, about 15 to about 30, about 10 to about 20, about 10 to about 25, about 10 to about 30, about 10 to about 35, about 18 to about 22, about 18 to about 20, about 16 to about 20, about 16 to about 22, about 16 to about 24, etc., weight percent actives based on a total weight of the composition. In other embodiments, the water-soluble solvent is present in an amount of from about 1 to about 25, about 5 to about 25, about 2 to about 19, about 3 to about 18, about 4 to about 17, about 5 to about 16, about 6 to about 15, about 7 to about 14, about 8 to about 13, about 9 to about 12, about 10 to about 11, or about 1, 2, 3, 4, 5, 6, 7, 8, 9, 10, 11, 12, 13, 14, 15, 16, 17, 18, 19, or 20, weight percent actives based on a total weight of the composition. In various non-limiting embodiments, all values and ranges of values, both whole and fractional, including and between the aforementioned values, are hereby expressly contemplated for use herein.

At Least One Rheology Control Agent

The composition also includes at least one rheology control agent. For example, a rheology modifier can be used that may increase rheology of the coating composition as compared to a coating composition free of the rheology modifier. An increase in rheology of the coating composition may improve suitability of the coating composition for application to the substrate utilizing the high transfer efficiency applicator. In this disclosure, the at least one rheology control agent is used to reduce and/or minimize sag, as described in greater detail below.

In various embodiments, the at least one rheology control agent is present in an amount of from about 0.01 to about 20, about 0.1 to about 20, about 0.1 to about 15, about 0.1 to about 10, about 0.1 to about 5, about 0.1 to about 1, about 0.1 to about 0.9, about 0.2 to about 0.8, about 0.3 to about 0.7, about 0.4 to about 0.6, about 0.5 to about 0.6, about 0.5 to about 10, about 1 to about 9.5, about 1.5 to about 9, about 2 to about 8.5, about 2.5 to about 8, about 3 to about 7.5, about 3.5 to about 7, about 4 to about 6.5, about 4.5 to about 6, about 5 to about 5.5, or about 0.01, 0.02, 0.03 . . . 0.1, 0.2, 0.3 . . . 1, 1.1, 1.2 . . . up to and including about 20, weight percent actives based on a total weight of the composition. In various embodiments, the at least one rheology control agent is present in an amount of from about 0.01 to about 7. In various non-limiting embodiments, all values and ranges of values, both whole and fractional, including and between the aforementioned values, are hereby expressly contemplated for use herein.

The at least one rheology control agent is chosen from an alkali swellable emulsion, a layered silicate, and combinations thereof. In various embodiments, the at least one rheology control agent is, includes, consists essentially of, or consists of, an alkali swellable emulsion, a layered silicate, and combinations thereof. For example, the terminology consists essentially of may describe embodiments that are free of any alternative rheology control agents. In one embodiment, the at least one rheology control agent includes the alkali swellable emulsion to the exclusion of the layered silicate. In another embodiment, the at least one rheology control agent includes the layered silicate to the exclusion of the alkali swellable emulsion. In another embodiment, both the alkali swellable emulsion and the layered silicate are utilized.

The alkali swellable emulsion (ASE) is not particularly limited and may be any known in the art. ASEs can include carboxyl-containing copolymers that are prepared by the addition polymerization of ethylenically unsaturated monomers and that swell or solubilize to thicken aqueous media on neutralization. These ASEs can be broadly classified as either conventional (presumably non-associative) or associative, depending on their chemical architecture and dominant mechanism of thickening. ASEs are typically copolymers of methacrylic acid and a non-water-soluble ester of that acid. ASEs typically thicken only in a neutralized (pH>7) state utilizing an ionic repulsion mechanism between the various carboxylate groups carried by the polymer chain. Typically, ASEs are manufactured in the form of direct emulsions of the alkali-swellable polymer in water, whose active ingredient content varies from about 10 to about 45% of total weight. In one embodiment, the ASE is an acrylic polymer emulsion.

In various embodiments, the alkali swellable emulsion is present in an amount of from about 1 to about 99, about 5 to about 95, about 10 to about 90, about 15 to about 85, about 20 to about 80, about 25 to about 75, about 30 to about 70, about 35 to about 65, about 40 to about 60, about 45 to about 55, or about 50 to about 55, weight percent actives based on a total weight of the at least one rheology control agent. In other embodiments, the alkali swellable emulsion is present in an amount of from about 0.1 to about 20, about 0.1 to about 15, about 0.1 to about 10, about 0.1 to about 5, about 0.1 to about 1, about 0.1 to about 0.9, about 0.2 to about 0.8, about 0.3 to about 0.7, about 0.4 to about 0.6, about 0.5 to about 0.6, about 0.5 to about 10, about 1 to about 9.5, about 1.5 to about 9, about 2 to about 8.5, about 2.5 to about 8, about 3 to about 7.5, about 3.5 to about 7, about 4 to about 6.5, about 4.5 to about 6, about 5 to about 5.5, or about 0.1, 0.2, 0.3 . . . 1, 1.1, 1.2 . . . up to and including about 20, weight percent actives based on a total weight of the composition. It is contemplated that the alkali swellable emulsion may not be used at all. In various non-limiting embodiments, all values and ranges of values, both whole and fractional, including and between the aforementioned values, are hereby expressly contemplated for use herein.

Referring now to the layered silicate, this compound also is not particularly limited and may be any known in the art. Layered silicates are typically silicates that include or consist of planar layers of octahedra bound to tetrahedra above and below with a characteristic repeat distance between t-o-t layers. For example, layered silicates may be classified as 7 Å layer silicates, 10 Å layer silicates, and chlorites based on their repeat distances. Minerals within these groups can be further divided into dioctahedral and trioctahedral. 7 Å layer silicates include kaolinite $Al_4(Si_4O_{10})(OH)_8$ (dioctahedral) and serpentine $Mg_6(Si_4O_{10})(OH)_8$ (trioctahedral). 10 Å layer silicates usually form as weathering product and can exhibit perfect planar cleavage such that they can be known as micas. The group can also include clay minerals. Chlorites include the di- and trioctahedral $Mg_5Al(AlSi_3O_{10})(OH)_8$. In various embodiments, layered silicates include or consist of two-dimensional (2D) layers of two fused silicate tetrahedral sheets with a dimension of approx. 1 nm thick and 100 nm to 1000 nm long and with an edge-shared octahedral sheet of metal atoms such as Mg or Al. The gap between the two sheets is called the gallery which is normally filled with cations to counterbalance the excess of negative charges. Stacking of sheets leads to a regular van der Waals gap between the layers. Isomorphic substitution within the layers (for example, $Al^{3+}$ replaced by $Mg^{2+}$ or $Fe^{2+}$, or $Mg^{2+}$ replaced by $Li^{1+}$) generates negative charges that are counterbalanced by alkali and alkaline earth cations situated inside the gaps. Layered silicates have two types of structures: tetrahedral-substituted and octahedral-substituted. In the case of tetrahedrally substituted layered silicates, the negative charge is located on the surface of silicate layers, and hence polymer matrices can interact more readily with these than with octahedrally substituted material. In various embodiments, MMT, hectorite, and saponite are commonly used layered silicates.

In certain embodiments, a laponite propylene glycol solution is utilized that includes a synthetic layered silicate, water, and polypropylene glycol. The synthetic layered silicate is commercially available from Altana AG of Wesel, Germany under the trade name Laponite RD.

In one embodiment, the layered silicate is a synthetic phyllosilicate.

In various embodiments, the layered silicate is present in an amount of from about 1 to about 99, about 5 to about 95, about 10 to about 90, about 15 to about 85, about 20 to about 80, about 25 to about 75, about 30 to about 70, about 35 to about 65, about 40 to about 60, about 45 to about 55, or about 50 to about 55, weight percent actives based on a total weight of the at least one rheology control agent. In other embodiments, the layered silicate is present in an amount of from about 0.1 to about 20, about 0.1 to about 15, about 0.1 to about 10, about 0.1 to about 5, about 0.1 to about 1, about 0.1 to about 0.9, about 0.2 to about 0.8, about 0.3 to about 0.7, about 0.4 to about 0.6, about 0.5 to about 0.6, about 0.5 to about 10, about 1 to about 9.5, about 1.5 to about 9, about 2 to about 8.5, about 2.5 to about 8, about 3 to about 7.5, about 3.5 to about 7, about 4 to about 6.5, about 4.5 to about 6, about 5 to about 5.5, about 0.1 to about 0.6, or about 0.1, 0.2, 0.3 . . . 1, 1.1, 1.2 . . . up to and including about 20, weight percent actives based on a total weight of the composition. It is contemplated that the layered silicate may not be used at all. In various non-limiting embodiments, all values and ranges of values, both whole and fractional, including and between the aforementioned values, are hereby expressly contemplated for use herein.

In various embodiments, a HEUR, i.e., a hydrophobically modified ethylene oxide-urethane block copolymer, may be utilized. The HEUR may be utilized in conjunction with, or in the absence of, one or both of the alkali swellable emulsion, the layered silicate, or combinations thereof. The HEUR is not particularly limited and may be any known in the art. For example, a polyalkylene glycol may be reacted with a hydrophobic capping agent or a hydrophobic difunctional agent or a combination thereof and a stoichiometric excess of a diisocyanate with respect to the sum of the moles of isocyanate reactive groups of the polyalkylene glycol and the capping agent or the hydrophobic difunctional agent or a combination thereof, to form a polyurethane prepolymer with isocyanate functionality. This prepolymer may be then be converted to a hydrophobically modified alkylene oxide poly(urethane-urea-allophanate) which may further include additional functionality such as amine functionality. However, this disclosure is not limited to such an HEUR and any known in the art can be used. For example any OH-functional compound and any isocyanate compound described herein can be used to corm the block copolymer.
Additional Optional Components:

The coating composition can include, or be free of, one or more various components, such as binders, dyes, additional rheology modifiers, carriers, catalysts, conventional additives, or combinations thereof. Conventional additives may include, but are not limited to, dispersants, antioxidants, UV stabilizers and absorbers, surfactants, wetting agents, leveling agents, antifoaming agents, anti-cratering agents, or combinations thereof. In embodiments, the coating composition is suitable for application to the substrate utilizing the high transfer efficiency applicator on the basis that the coating composition includes certain components and/or includes certain components in a specific amount/ratio.

In various embodiments, the coating composition may further include dyes. Non-limiting examples of suitable dyes include triphenylmethane dyes, anthraquinone dyes, xanthene and related dyes, azo dyes, reactive dyes, phthalocyanine compounds, quinacridone compounds, and fluorescent brighteners, and combinations thereof. The coating composition may include the dye in an amount of from about 0.01 to about 5, alternatively from about 0.05 to about 1, or alternatively from about 0.05 to about 0.5, wt. %, based on a total weight of the coating composition. In certain embodiments, the coating composition includes a 10% black dye solution, such as Sol. Orasol Negro RL. In various non-limiting embodiments, all values and ranges of values, both whole and fractional, including and between the aforementioned values, are hereby expressly contemplated for use herein.

In various embodiments, the coating composition may further include an additional rheology modifier in addition to those described above. Many different types of rheology modifiers can be used in coating compositions may be utilized in the coating composition. Non-limiting examples of suitable rheology modifiers include urea-based compounds, acrylic alkali emulsions, and combinations thereof. The coating composition may include the additional rheology modifier in an amount of from about 0.01 to about 5, alternatively from about 0.05 to about 1, or alternatively from about 0.05 to about 0.5, wt. %, based on a total weight of the coating composition. In various non-limiting embodiments, all values and ranges of values, both whole and fractional, including and between the aforementioned values, are hereby expressly contemplated for use herein.

The term "binder" refers to film forming constituents of the coating composition. Typically, a binder can include polymers, oligomers, or a combination thereof that are essential for forming a coating having desired properties, such as hardness, protection, adhesion, and others. Additional components, such as carriers, pigments, catalysts, rheology modifiers, antioxidants, UV stabilizers and absorbers, leveling agents, antifoaming agents, anti-cratering agents, or other conventional additives may not be included in the term "binder" unless any of these additional components are film forming constituents of the coating composition. One or more of those additional components can be included in the coating composition. In certain embodiments, the binder includes polymers. The coating composition may include the binder in an amount of from about 5 to about 70 wt. %, alternatively from about 10 to about 50 wt. %, or alternatively from about 15 to about 25 wt. %, based on a total weight of the coating composition. In various non-limiting embodiments, all values and ranges of values, both whole and fractional, including and between the aforementioned values, are hereby expressly contemplated for use herein.

The coating composition may further include a catalyst. The coating composition may further include a catalyst to reduce curing time and to allow curing of the coating composition at ambient or elevated temperatures. The ambient temperatures are typically referred to as temperatures in a range of from about 18° C. to about 35° C. Non-limiting examples of suitable catalysts may include organic metal salts, such as, dibutyl tin dilaurate, dibutyl tin diacetate, dibutyl tin dichloride, dibutyl tin dibromide, zinc naphthenate; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts and other catalysts, or a combination thereof. Non-limiting examples of suitable acid catalysts may include carboxylic acids, sulfonic acids, phosphoric acids or a combination thereof. In some embodiments, the acid catalyst can include, for example, acetic acid, formic acid, dodecyl benzene sulfonic acid, dinonyl naphthalene sulfonic acid, para-toluene sulfonic acid, phosphoric acid, or a combination thereof. The coating composition may include the catalysts in an amount of from about 0.01 to about 5, alternatively from about 0.05 to about 1, or alternatively from about 0.05 to about 0.5, wt. %, based on a total weight of the coating composition. In various non-limiting embodiments, all values and ranges of values, both whole and fractional, including and between the aforementioned values, are hereby expressly contemplated for use herein.

The coating composition may further include conventional additives. The coating composition may further include an ultraviolet light stabilizer. Non-limiting examples of such ultraviolet light stabilizers include ultraviolet light absorbers, screeners, quenchers, and hindered amine light stabilizers. An antioxidant can also be added to the coating composition. Typical ultraviolet light stabilizers can include benzophenones, triazoles, triazines, benzoates, hindered amines and mixtures thereof. A blend of hindered amine light stabilizers, such as Tinuvin® 328 and Tinuvin®123, all commercially available from Ciba Specialty Chemicals of Tarrytown, New York, under the trade name Tinuvin®, can be utilized.

Non-limiting examples of suitable ultraviolet light absorbers include hydroxyphenyl benzotriazoles, such as, 2-(2-hydroxy-5-methylphenyl)-2H-benzotrazole, 2-(2-hydroxy-3,5-di-tert.amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4, 6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl)1,3,5-triazine, 2-(4-octyloxy-2-hydroxyphenyl)-4, 6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Non-limiting examples of suitable hindered amine light stabilizers include N-(1,2,2,6,6-pentamethyl-4-piperidinyl)-2-dodecyl succinimide, N(lacetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N, N'''-dibutyl-N', N'''-bis(1,2,2,6,6-pentamethyl-4-piperidinyl)], poly-[[6-[[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl)methyl] butyl propanedioate, 8-acetyl-3-dodecyl-7,7,9,9,-tetramethyl-1,3,8-triazaspiro(4,5)decane-2,4-dione, and dodecyl/tetradecyl-3-(2,2,4,4-tetramethyl-21-oxo-7-oxa-3,20-diazal dispiro(5.1.11.2)henicosan-20-yl)propionate.

Non-limiting examples of suitable antioxidants include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6 (1H,3H,5H)-trione and benzenepropanoic acid, 3,5-bis(1,1-dimethyl-ethyl)-4-hydroxy-C7-C9 branched alkyl esters. In certain embodiments, the antioxidant includes hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168 from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals, and Doverphos® S-9228 from Dover Chemicals.

The coating composition may further include other additives known in the art such as wetting agents, leveling and flow control agents, for example, Resiflow®S (polybutylacrylate), BYK® 320 and 325 (high molecular weight polyacrylates), BYK® 347 (polyether-modified siloxane) under respective trade names, leveling agents based on (meth)acrylic homopolymers; rheological control agents; thickeners, such as partially crosslinked polycarboxylic acid or polyurethanes; and antifoaming agents. The other additives can be used in conventional amounts familiar to those skilled in the art. In embodiments, the wetting agents, leveling agents, flow control agents, and surfactants of the coating composition can affect the surface tension of the coating composition and thus may have an impact on the suitability of the coating composition for printing. Certain wetting agents, leveling agents, flow control agents, and surfactants may be incorporated into the coating composition for increasing or decreasing the surface tension of the coating composition.

The coating composition is not particularly limited relative to solids content and may have a solids content of from about 5 to about 90, alternatively from 5 to about 80, about 15 to about 70, wt. %, about 15 to about 30, about 10 to about 35, or about 20 to about 25, wt. %. based on a weight of the composition. In other embodiments, the solids content is from about 5 to about 85, about 10 to about 80, about 15 to about 75, about 20 to about 70, about 25 to about 65, about 30 to about 60, about 35 to about 55, about 40 to about 50, or about 45 to about 50, wt. %, based on a weight of the composition. The solids content may be determined in accordance with ASTM D2369-10. In certain embodiments, the higher solids content for the coating composition may be desired due to the coating composition not undergoing atomization utilizing conventional spray equipment. In various non-limiting embodiments, all values and ranges of values, both whole and fractional, including and between the aforementioned values, are hereby expressly contemplated for use herein.

In one embodiment, the ASE is an acrylic alkali emulsion. In another embodiment, the layered silicate is provided in a solution of water and polypropylene glycol. In another embodiment, a polyester-modified acrylic dispersion containing epoxy groups is utilized. In another embodiment, a styrene-acrylic latex dispersion formed by a two-step emulsion polymerization process, is utilized. This dispersion may be or have, for example, 46 wt % solid, Tg ~-7C, acid number ~12, and a hydroxyl number ~7. In another embodiment, a polyurethane dispersion resin is formed from a slightly branched polyester polyol and hexamethylene diisocyanate. In another embodiment, a polyurethane dispersion resin is formed from a linear polyester diol resin (e.g. a reaction product of monomers 1,6-hexanediol, adipic acid, and isophthalic acid) and isophorone diisocyanate. In another embodiment, a polyurethane dispersion resin is formed from a linear polycarbonate-polyester polyol and isophorone diisocyanate. In another embodiment, a Hexa (methoxymethyl)melamine (HMMM) melamine formaldehyde resin is utilized. In another embodiment, a high imino melamine-formaldehyde resin is utilized. In another embodiment, a dispersion of amorphous carbon black pigment is utilized. In another embodiment, a dispersion of micronized talc extender pigment is utilized.

Physical Properties:

In various embodiments, the coating composition has a viscosity of about 20 to about 100 cps as determined using ASTM 7867-13 with cone-and-plate or parallel plates at a shear rate of 1000 sec-1. For example, the composition may have a viscosity of from about 25 to about 95, about 30 to about 90, about 35 to about 85, about 40 to about 80, about 45 to about 75, about 50 to about 70, about 55 to about 65, or about 60 to about 65, cps. In various non-limiting embodiments, all values and ranges of values, both whole and fractional, including and between the aforementioned values, are hereby expressly contemplated for use herein.

In other embodiments, the coating composition has a wet film thickness of at least about 20, 25, 30, or more microns measured at about 45 degrees without visible sag. For example, this wet film thickness may be from about 30 micron to about 150 micron, or about 40 to about 120, microns measured at about 45 degrees without visible sag. In other embodiments, the wet film thickness may be about 35 to about 145, about 40 to about 140, about 45 to about 135, about 40 to about 130, about 45 to about 125, about 50 to about 120, about 55 to about 115, about 60 to about 110, about 65 to about 105, about 70 to about 100, about 75 to about 95, about 80 to about 90, or about 85 to about 90, microns. In various non-limiting embodiments, all values and ranges of values, both whole and fractional, including and between the aforementioned values, are hereby expressly contemplated for use herein.

To evaluate sag, the following procedure is typically employed:

A substrate panel is oriented horizontally prior to coating application;

A Rea Jet DOD 2.0 32 nozzle print head is used to apply 4 separate stripes with different thickness each with a width of 40 mm. of the coating composition to the horizontal substrate panel. After application of the composition, the panel is tilted at an angle of about 45 degrees from horizontal. After about 5 minutes at room temperature, with the panel angle maintained the same, the panel is baked at about 140° C. for about 30 minutes. Sag, if present, is evidenced by drips at the bottom edge of the coating, and is evaluated visually.

In various embodiments, sag is determined using ASTM D4400-18. Typically, ASTM D4400 method and the printing method are both performed at a 45 degree angle. In one embodiment, the following is used: ASTM D4400-18 w/ASM-2 and ASM-1 Anti-Sag meter, on coil coated panel, 45 degree, with 4 min room temperature flash and 30 min 1400 bake.

The composition may also have a yield stress of greater than about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9. 2, 2.1, 2.2, 2.3, 2.4, or 2.5. In various embodiments, the yield strength is from about 0.1 to about 2.5, about 0.5 to about 2.5, about 1 to about 2.5, about 1.5 to about 2.5, about 2 to about 2.5, about 0.5 to about 2, about 0.5 to about 1.5, about 0.5 to about 1, about 1 to about 2, about 1 to about 1.5, or about 1.5 to about 2, Pa. Typically, yield stress is measured using a controlled stress sweep test on a rheometer with cone and plate geometry. A sample is sheared at each shear stress from 0.01 Pa to 10,000 Pa and a shear rate and viscosity is measured. The viscosity data and the first derivative is then plotted against shear stress in log-log scale. The yield stress value is determined by the stress with lowest first derivative (i.e. largest negative slope of in viscosity-stress curve). In various non-limiting embodiments, all values and ranges of values, both whole and fractional, including and between the aforementioned values, are hereby expressly contemplated for use herein.

In various embodiments, the coating composition has a viscosity of from about 400 to about 10,000, about 400 to about 1000, about 500 to about 900, about 600 to about 800, about 600 to about 700, about 1,000 to about 9,500, about 1,500 to about 9,000, about 2,000 to about 8,500, about 2,500 to about 8,000, about 3,000 to about 7,500, about 3,500 to about 7,000, about 4,000 to about 6,500, about 4,500 to about 6,000, or about 5,000 to about 5,500, mPa·s at 0.1 s−1, as determined using ASTMD7867. In other embodiments, the coating composition has a viscosity of from about 20 to about 100, about 25 to about 95, about 30 to about 90, about 35 to about 85, about 40 to about 80, about 45 to about 75, about 50 to about 70, about 55 to about 60, or about 60 to about 65, mPa·s at 1000 s−1, as determined using ASTMD7867. In other embodiments, the coating composition has a viscosity of from about 50 to about 1,000, about 100 to about 950, about 150 to about 900, about 200 to about 850, about 250 to about 800, about 300 to about 750, about 350 to about 700, about 400 to about 650, about 450 to about 600, or about 500 to about 550, mPa·s at 1 s−1, 5 seconds after 10000 s−1 shear, as determined using ASTMD7867. In various non-limiting embodiments, all values and ranges of values, both whole and fractional, including and between the aforementioned values, are hereby expressly contemplated for use herein.

Curing the Coating Composition:

In various embodiments, the method further includes the step of curing the coating composition on the substrate. For example, the coating composition may be free of visual appearance defects due to incomplete flow and leveling from individual nozzle lines after the step of curing.

ADDITIONAL EMBODIMENTS

In one embodiment, the resin dispersion is present in an amount of from about 15 to about 30 weight percent based on a total weight of the composition; the cross-linker is melamine and is present in an amount of from about 2 to about 7 weight percent based on a total weight of the composition; the pigment is present in an amount of from about 0.1 to about 20 weight percent based on a total weight of the composition; the water is present in an amount of from about 15 to about 70 weight percent based on a total weight of the composition; the water soluble solvent is present in a total amount of from about 5 to about 20 weight percent based on a total weight of the composition; and the at least one rheology control agent is present in an amount of from about 0.01 to about 5 weight percent based on a total weight of the composition; wherein the coating composition has a viscosity of about 35 to about 95 cPs as determined using ASTM 7867-13 with cone-and-plate or parallel plates at a shear rate of 1000 sec-1, and wherein the coating composition has a wet film thickness of at least about 20 microns measured at about 45 degrees without visible sag as determined using ASTM D4400-18.

In another embodiment, the resin dispersion is present in an amount of from about 19 to about 22 weight percent based on a total weight of the composition and comprises: an acrylic latex dispersion present in an amount of from about 9 to about 11 weight percent based on a total weight of the composition and that is a polyester-modified acrylic dispersion containing epoxy groups; a first polyurethane dispersion present in an amount of about 4.5 to about 5.5 weight percent based on a total weight of the composition and that is formed from a branched polyester polyol and hexamethylene diisocyanate; a second polyurethane dispersion present in an amount of from about 3 to about 4 weight percent based on a total weight of the composition and that is formed from a linear polyester diol resin and isophorone diisocyanate wherein the linear polyester diol is the reaction product of 1,6-hexanediol, adipic acid, and isophthalic acid; and a third polyurethane dispersion present in an amount of from about 1 to about 2 weight percent based on a total weight of the composition and that is formed from a linear polycarbonate-polyester polyol and isophorone diisocyanate; the cross-linker is melamine and is present in an amount of from about 3.9 to about 4.6 weight percent based on a total weight of the composition; the pigment is an emulsion and is present in an amount of from about 8 to about 16 weight percent based on a total weight of the composition; the water is present in an amount of from about 35 to about 45 weight percent based on a total weight of the composition; the water soluble solvent is butanol and is present in an amount of from about 6 to about 7 weight percent based on a total weight of the composition; and the at least one rheology control agent is the alkali swellable emulsion that is an acrylic copolymer emulsion and that is present in an amount of from about 4 to about 5 weight percent based on a total weight of the composition and the composition is free of the layered silicate; wherein the coating composition has a viscosity of about 35 to about 70 cps as determined using ASTM 7867-13 with cone-and-plate or parallel plates at a shear rate of 1000 sec-1, and wherein the coating composition has a wet film thickness of at least about 20 microns measured at about 45 degrees without visible sag as determined using ASTM D4400-18.

In another embodiment, the resin dispersion is present in an amount of from about 28 to about 29 weight percent based on a total weight of the composition and comprises: an acrylic latex dispersion present in an amount of from about 8 to about 9 weight percent based on a total weight of the composition and that is a styrene-acrylic latex dispersion; a first polyurethane dispersion present in an amount of from about 12 to about 13 weight percent based on a total weight of the composition and that is formed from a branched polyester polyol and hexamethylene diisocyanate; and a second polyurethane dispersion present in an amount of from about 8 to about 9 weight percent based on a total weight of the composition and that is formed from a linear polyester diol resin and isophorone diisocyanate wherein the linear polyester diol is the reaction product of 1,6-hexanediol, adipic acid, and isophthalic acid; the cross-linker is melamine and is present in an amount of from about 2 to about 3 weight percent based on a total weight of the composition; the pigment is an emulsion and is present in an amount of from about 5 to about 6 weight percent based on a total weight of the composition; the water is present in an amount of from about 40 to about 50 weight percent based on a total weight of the composition; the water soluble solvent is butanol and is present in an amount of from about 7 to about 8 weight percent based on a total weight of the composition; and the at least one rheology control agent is the alkali swellable emulsion that is an acrylic copolymer emulsion and that is present in an amount of about 2.5 weight percent based on a total weight of the composition and the composition is free of the layered silicate; wherein the coating composition has a viscosity of about 90 to about 95 cps as determined using ASTM 7867-13 with cone-and-plate or parallel plates at a shear rate of 1000 sec-1, wherein the coating composition has a yield stress of less than about 0.5 Pa, and wherein the coating composition has a wet film thickness of at least about 20 microns measured at about 45 degrees without visible sag as determined using ASTM D4400-18.

In another embodiment, the resin dispersion is present in an amount of from about 19 to about 20 weight percent based on a total weight of the composition and comprises: an acrylic latex dispersion present in an amount of from about 9 to about 10 weight percent based on a total weight of the composition and that is a polyester-modified acrylic dispersion containing epoxy groups; a first polyurethane dispersion present in an amount of from about 4 to about 5 weight percent based on a total weight of the composition and that is formed from a branched polyester polyol and hexamethylene diisocyanate; and a second polyurethane dispersion present in an amount of from about 3 to about 4 weight percent based on a total weight of the composition and that is formed from a linear polyester diol resin and isophorone diisocyanate wherein the linear polyester diol is the reaction product of 1,6-hexanediol, adipic acid, and isophthalic acid; and a third polyurethane dispersion present in an amount of from about 1 to about 2 weight percent based on a total weight of the composition and that is formed from a linear polycarbonate-polyester polyol and isophorone diisocyanate; the cross-linker is melamine and is present in an amount of from about 3 to about 4 weight percent based on a total weight of the composition; the pigment is an emulsion and is present in an amount of from about 15 to about 17 weight percent based on a total weight of the composition; the water is present in an amount of from about 30 to about 35 weight percent based on a total weight of the composition; the water soluble solvent is butanol and is present in an amount of from about 6 to about 7 weight percent based on a total weight of the composition; and the at least one rheology control agent comprises the alkali swellable emulsion that is an acrylic copolymer emulsion and that is present in an amount of from about 3 to about 3.5 weight percent based on a total weight of the composition and the layered silicate in an amount of from about 0.1 to about 0.5 weight percent based on a total weight of the composition; wherein the coating composition has a viscosity of about 70 to about 75 cps as determined using ASTM 7867-13 with cone-and-plate or parallel plates at a shear rate of 1000 sec-1, wherein the coating composition has a yield stress of at least about 2 Pa, and wherein the coating composition has a wet film thickness of at least about 20 microns measured at about 45 degrees without visible sag as determined using ASTM D4400-18.

In another embodiment, the resin dispersion is present in an amount of from about 27 to about 28 weight percent based on a total weight of the composition and comprises: an acrylic latex dispersion present in an amount of about 8 to about 9 weight percent based on a total weight of the composition and that is a styrene-acrylic latex dispersion; and a second polyurethane dispersion present in an amount of about 6.5 to about 7.5 weight percent based on a total weight of the composition and that is formed from a linear polyester diol resin and isophorone diisocyanate wherein the linear polyester diol is the reaction product of 1,6-hexanediol, adipic acid, and isophthalic acid; and the cross-linker is melamine and is present in an amount of from about 2 to about 3 weight percent based on a total weight of the composition; the pigment is an emulsion and is present in an amount of about 1 to about 2 weight percent based on a total weight of the composition; the water is present in an amount of from about 15 to about 20 weight percent based on a total weight of the composition; the water soluble solvent is butanol and is present in an amount of about 7 to about 8 weight percent based on a total weight of the composition; and the at least one rheology control agent comprises the alkali swellable emulsion that is an acrylic copolymer emulsion and that is present in an amount of from about 3 to about 3.5 weight percent based on a total weight of the composition and the layered silicate in an amount of from about 0.1 to about 0.5 weight percent based on a total weight of the composition; wherein the coating composition has a viscosity of about 90 to about 95 cps as determined using ASTM 7867-13 with cone-and-plate or parallel plates at a shear rate of 1000 sec-1, wherein the coating composition has a yield stress of at least about 1 Pa, and wherein the coating composition has a wet film thickness of at least about 20 microns measured at about 45 degrees without visible sag as determined using ASTM D4400-18.

In another embodiment, the resin dispersion is present in an amount of from about 19 to about 22 weight percent based on a total weight of the composition and comprises: an acrylic latex dispersion that is a polyester-modified acrylic dispersion containing epoxy groups; a first polyurethane dispersion that is formed from a branched polyester polyol and hexamethylene diisocyanate; a second polyurethane dispersion that is formed from a linear polyester diol resin and isophorone diisocyanate wherein the linear polyester diol is the reaction product of 1,6-hexanediol, adipic acid, and isophthalic acid; and a third polyurethane dispersion that is formed from a linear polycarbonate-polyester polyol and isophorone diisocyanate.

In another embodiment, the acrylic latex dispersion is present in an amount of from about 9 to about 11 weight percent based on a total weight of the composition; the first polyurethane dispersion is present in an amount of about 4.5 to about 5.5 weight percent based on a total weight of the composition; the second polyurethane dispersion is present in an amount of from about 3 to about 4 weight percent based on a total weight of the composition; and the third polyurethane dispersion is present in an amount of from about 1 to about 2 weight percent based on a total weight of the composition, and wherein the alkali swellable emulsion is an acrylic copolymer emulsion and the layered silicate is a synthetic phyllosilicate.

In another embodiment, the resin dispersion is present in an amount of from about 28 to about 29 weight percent based on a total weight of the composition and comprises: an acrylic latex dispersion that is a styrene-acrylic latex dispersion; a first polyurethane dispersion that is formed from a branched polyester polyol and hexamethylene diisocyanate; and a second polyurethane dispersion that is formed from a linear polyester diol resin and isophorone diisocyanate wherein the linear polyester diol is the reaction product of 1,6-hexanediol, adipic acid, and isophthalic acid.

In another embodiment, the acrylic latex dispersion is present in an amount of from about 8 to about 9 weight percent based on a total weight of the composition; the first polyurethane dispersion is present in an amount of from about 12 to about 13 weight percent based on a total weight of the composition; and the second polyurethane dispersion is present in an amount of from about 8 to about 9 weight percent based on a total weight of the composition, and wherein the alkali swellable emulsion is an acrylic copolymer emulsion and the layered silicate is a synthetic phyllosilicate.

In another embodiment, the resin dispersion is present in an amount of from about 19 to about 20 weight percent based on a total weight of the composition and comprises: an acrylic latex dispersion that is a polyester-modified acrylic dispersion containing epoxy groups; a first polyurethane dispersion that is formed from a branched polyester polyol and hexamethylene diisocyanate; and a second polyurethane dispersion that is formed from a linear polyester diol resin and isophorone diisocyanate wherein the linear polyester diol is the reaction product of 1,6-hexanediol, adipic acid, and isophthalic acid; and a third polyurethane dispersion that is formed from a linear polycarbonate-polyester polyol and isophorone diisocyanate.

In another embodiment, the acrylic latex dispersion is present in an amount of from about 9 to about 10 weight percent based on a total weight of the composition; the first polyurethane dispersion is present in an amount of from about 4 to about 5 weight percent based on a total weight of the composition; and the second polyurethane dispersion is present in an amount of from about 3 to about 4 weight percent based on a total weight of the composition; and the third polyurethane dispersion is present in an amount of from about 1 to about 2 weight percent based on a total weight of the composition, and wherein the alkali swellable emulsion is an acrylic copolymer emulsion and the layered silicate is a synthetic phyllosilicate.

In a further embodiment, the resin dispersion is present in an amount of from about 27 to about 28 weight percent based on a total weight of the composition and comprises: an acrylic latex dispersion that is a styrene-acrylic latex dispersion; and a second polyurethane dispersion that is formed from a linear polyester diol resin and isophorone diisocyanate wherein the linear polyester diol is the reaction product of 1,6-hexanediol, adipic acid, and isophthalic acid.

In another embodiment, the acrylic latex dispersion is present in an amount of about 8 to about 9 weight percent based on a total weight of the composition; and the second polyurethane dispersion is present in an amount of about 6.5 to about 7.5 weight percent based on a total weight of the composition, and wherein the alkali swellable emulsion is an acrylic copolymer emulsion and the layered silicate is a synthetic phyllosilicate.

In one embodiment, the resin dispersion comprises the latex and is free of the polyurethane. In another embodiment, the resin dispersion comprises the polyurethane and is free of the latex. In a further embodiment, the latex is chosen from a polyester-modified acrylic dispersion containing epoxy groups, a styrene-acrylic latex dispersion, and combinations thereof; and the polyurethane is chosen from one formed from a branched polyester polyol and hexamethylene diisocyanate; formed from a linear polyester diol resin and isophorone diisocyanate wherein the linear polyester diol is the reaction product of 1,6-hexanediol, adipic acid, and isophthalic acid; formed from a linear polycarbonate-polyester polyol and isophorone diisocyanate; a polyester-polyurethane polymer; and combinations thereof.

In another embodiment, the alkali swellable emulsion is an acrylic copolymer emulsion and the layered silicate is a synthetic phyllosilicate.

In another embodiments, the resin dispersion is present in an amount of from about 10 to about 35 weight percent actives based on a total weight of the composition; the cross-linker is melamine and is present in an amount of from about 2 to about 8 weight percent actives based on a total weight of the composition; the pigment is present in an amount of from about 0.1 to about 20 weight percent actives based on a total weight of the composition; the water is present in an amount of from about 15 to about 70 weight percent actives based on a total weight of the composition; the water soluble solvent is present in a total amount of from about 5 to about 25 weight percent actives based on a total weight of the composition; and the at least one rheology control agent is present in an amount of from about 0.01 to about 7 weight percent actives based on a total weight of the composition; wherein the coating composition has a viscosity of about 35 to about 95 cPs as determined using ASTM 7867-13 with cone-and-plate or parallel plates at a shear rate of 1000 sec-1, and wherein the coating composition has a wet film thickness of at least about 20 microns measured at about 45 degrees without visible sag as determined using ASTM D4400-18.

In a further embodiment, the resin dispersion is present in an amount of from about 12 to about 20 weight percent actives based on a total weight of the composition and comprises: an acrylic latex dispersion present in an amount of from about 3 to about 5 weight percent actives based on a total weight of the composition and that is a polyester-modified acrylic dispersion containing epoxy groups; a first polyurethane dispersion present in an amount of about 1.5 to about 2.5 weight percent actives based on a total weight of the composition and that is formed from a branched polyester polyol and hexamethylene diisocyanate; a second polyurethane dispersion present in an amount of from about 1 to about 2 weight percent actives based on a total weight of the composition and that is formed from a linear polyester diol resin and isophorone diisocyanate wherein the linear polyester diol is the reaction product of 1,6-hexanediol, adipic acid, and isophthalic acid; and a third polyurethane dispersion present in an amount of from about 0.5 to about 1.5 weight percent actives based on a total weight of the composition and that is formed from a linear polycarbonate-polyester polyol and isophorone diisocyanate; the cross-linker is melamine and is present in an amount of from about 3 to about 4 weight percent actives based on a total weight of the composition; the pigment dispersion is present in an amount of from about 0.5 to about 4.5 weight percent actives (this is carbon black only) based on a total weight of the composition; the water is present in an amount of from about 55 to about 70 weight percent actives based on a total weight of the composition; the water soluble solvent is butanol and is present in an amount of from about 10 to about 20 weight percent actives based on a total weight of the composition; and the at least one rheology control agent is the alkali swellable emulsion that is an acrylic copolymer emulsion and that is present in an amount of from about 0.1 to about 2 weight percent actives based on a total weight of the composition; wherein the coating composition has a viscosity of about 35 to about 70 cps as determined using ASTM 7867-13 with cone-and-plate or parallel plates at a shear rate of 1000 sec-1, and wherein the coating composition has a wet film thickness of at least about 20 microns measured at about 45 degrees without visible sag as determined using ASTM D4400-18.

Coating Layer:

This disclosure also provides the coating layer itself that is formed from applying the coating composition to the substrate. The coating layer is not particularly limited in physical properties. Typically, the coating layer has a wet film thickness of from about 1 to about 10, or about 1, 2, 3, 4, 5, 6, 7, 8, 9, or 10, mils. Typically, the coating layer has a dry film thickness of from about 0.6 to about 2, about 0.7 to about 1.9, about 0.8 to about 1.8, about 0.9 to about 1.7, about 1 to about 1.6, about 1.1 to about 1.5, about 1.2 to about 1.4, or about 1.3 to about 1.4, mils. One or more of these measurements may be made in accordance with ASTM D7091-13.

In other embodiments, e.g. when the coating composition is used to form a monocoat or exterior layer of a coating system, the coating layer may have a solvent resistance of at least 5 double MEK rubs, alternatively at least 10 double MEK rubs, or alternatively at least 20, 35, 30, 35, 40, 45, 50, 55, 6-, 65, 70, 75, 80, 85, 90, 95, or 100, double MEK rubs, on a nonporous substrate in accordance with ASTM D4752. In other embodiments, the coating layer may have a film tensile modulus of at least 100 MPa, alternatively at least 100 MPa, or alternatively at least 200 MPa, in accordance with ASTM 5026-15. In other embodiments, the coating layer may have a crosslink density of at least 0.2 mmol/cm$^3$, alternatively at least 0.5 mmol/cm$^3$, or alternatively at least 1.0 mmol/cm$^3$, in accordance with ASTM D5026-15. In other embodiments, the coating layer may have a gloss value of at least 75, alternatively at least 88, or alternatively at least 92, at a 20 degree specular angle in accordance with ASTM 2813. In other embodiments, the coating layer may have a gloss retention of at least 50%, alternatively at least 70%, or alternatively at least 90%, of the initial gloss value after 2000 hours of weathering exposure in accordance with ASTM D7869. In various non-limiting embodiments, all values and ranges of values, both whole and fractional, including and between the aforementioned values set forth above.

The coating layer may be cured, uncured, or partially cured. The coating layer is not particularly limited in cure type and may utilize any cure mechanism associated with any one or more of the components described above. The cure may be effected, either partially or totally, at ambient conditions, e.g. using condensation cure or free radical cure, or any other appropriate cure typical appreciated by one of skill in the art, and/or at elevated temperatures, e.g. in an oven at temperatures up to about 400° F. The coating layer may be flashed to drive off water and/or solvent and this flashing may or may not effect cure, in whole or in part.

Throughout this disclosure, the terminology "about" may mean that a value can optionally vary by ±1, 2, 4, 5, 6, 7, 8, 9, or 10%. However, in other embodiments, "about" can also mean the exact value.

EXAMPLES

A series of coating compositions, both inventive and comparative, are described as set forth below. After formation, each of the compositions is also evaluated to determine various physical properties, as also set forth below.

|  | Comp 1 | Comp 2 | Comp 3 | Comp 4 | Comp 5 | Comp 6 |
| --- | --- | --- | --- | --- | --- | --- |
| Alkali swellable emulsion | 1.3% | 1.6% | 1.1% | 1.1% | 1.1% | 1.6% |
| Layered silicate | 0.0% | 0.0% | 0.3% | 0.3% | 0.0% | 0.0% |
| Acrylic latex dispersion 1 | 10.6% | 9.4% | 9.4% | 9.3% | 9.4% | 10.1% |
| Acrylic latex dispersion 2 |  |  |  |  |  |  |
| Polyurethane dispersion 1 | 5.2% | 4.6% | 4.6% | 4.6% | 4.6% | 5.0% |
| Polyurethane dispersion 2 | 3.9% | 3.5% | 3.5% | 3.5% | 3.5% | 3.8% |
| Polyurethane dispersion 3 | 1.9% | 1.7% | 1.7% | 1.7% | 1.7% | 1.8% |
| Polyurethane dispersion 4 |  |  |  |  |  |  |
| HMMM melamine | 3.7% | 3.3% | 3.3% | 3.3% | 3.3% | 3.7% |
| High imino melamine | 0.7% | 0.6% | 0.6% | 0.6% | 0.6% | 0.7% |
| Black pigment dispersion | 8.7% | 16.0% | 16.0% | 16.0% | 16.0% | 8.5% |
| Talc dispersion |  |  |  |  |  | 2.2% |
| Butanol | 6.3% | 6.3% | 6.3% | 6.7% | 6.3% | 6.2% |
| Ethylene glycol monobutyl ether | 1.9% | 1.3% | 1.3% | 1.3% | 1.3% | 1.2% |
| Diethylene glycol monobutyl ether | 2.8% | 2.8% | 2.8% | 2.7% | 2.8% | 2.8% |
| Dipropylene glycol methyl ether | 1.0% | 1.0% | 1.0% | 1.0% | 1.0% | 1.0% |
| DI water | 45.9% | 42.3% | 42.3% | 42.0% | 42.9% | 45.4% |
| Mineral spirit | 1.0% | 1.0% | 1.0% | 1.0% | 1.0% | 1.0% |
| Polypropylene glycol | 1.0% | 0.9% | 1.2% | 1.2% | 0.9% | 1.0% |
| Others (defoamer, leveling agent, additives, dye, amine) | 4.0% | 3.7% | 3.7% | 3.7% | 3.7% | 4.0% |
| pH | 7.5 | 7.7 | 8 | 8 | 7.9 | 7.5 |
| Solid wt % | 19 | 19 | 20 | 20 | 19 | 20 |
| Solid vol % | 16 | 17 | 17 | 17 | 16 | 16 |
| Viscosity (mPa · s) at | | | | | | |
| 0.1 s−1 | 458 | 5452 | 5046 | 4581 | 927 | 1914 |
| 1000 s−1 | 38 | 67 | 71 | 74 | 44 | 49 |
| Viscosity (mPa · s) at 1 s−1 and 5 second after 10,000 s−1 shear | 112 | 402 | 519 | 603 | 119 | 299 |
| Yield stress (Pa) | 0 | 1 | 2 | 2 | 1 | 0.5 |
| ASTM D4400-18 w/ASM-2 and ASM-1 Anti-Sag meter, on coil coated panel, 45 degree, 4 min RT flash | | | | | | |
| Max drawdown bar gap w/o fat edge (mil) | 3.5 | 5.5 | 4.5 | 5.5 | 3.5 | 4.0 |
| Max drawdown bar gap w/o sag nose (mil) | 4.0 | 7.0 | 7.0 | 7.0 | 5.0 | 5.0 |
| Min drawdown bar gap w/sag nose (mil) | 4.5 | 8.0 | 8.0 | 8.0 | 5.5 | 5.5 |
| Print on coil coat and clearcoat metal panels, 45 degree, Average, 4 min RT flash | | | | | | |
| Max DFT w/o fat edge (um) | 5 | 13 | 15 | 12 | <8 | 8 |
| Calculated wet film thickness w/o fat edge (um) | 31 | 79 | 88 | 71 | <51 | 51 |
| Max DFT w/o sag nose (um) | 12 | 14 | 22 | 17 | 9 | 15 |
| Calculated wet film thickness w/o sag nose (um) | 77 | 80 | 128 | 100 | 56 | 93 |
| Min DFT w/sag nose (um) | 14 | 15 | >22 | 18 | 16 | 18 |
| Calculated wet film thickness w sag nose (um) | 85 | 91 | >137 | 106 | 98 | 111 |

|  | Comp 7 | Comp 8 | Comp 9 | Comp 10 | Comp 11 |
| --- | --- | --- | --- | --- | --- |
| Alkali swellable emulsion | 0.0% | 1.4% | 1.5% | 0.0% | 0.0% |
| Layered silicate | 0.0% | 0.0% | 0.0% | 0.0% | 0.0% |
| Acrylic latex dispersion 1 |  |  |  |  | 9.4% |
| Acrylic latex dispersion 2 | 7.7% | 8.1% | 8.6% | 8.8% |  |
| Polyurethane dispersion 1 | 12.0% | 12.6% |  |  | 4.6% |
| Polyurethane dispersion 2 | 7.8% | 8.2% | 7.0% | 7.1% | 3.5% |
| Polyurethane dispersion 3 |  |  |  |  | 1.7% |
| Polyurethane dispersion 4 |  |  | 11.9% | 12.2% |  |
| HMMM melamine | 1.7% | 1.8% | 2.1% | 2.1% | 3.3% |
| High imino melamine | 0.3% | 0.3% | 0.4% | 0.4% | 0.6% |
| Black pigment dispersion | 4.8% | 5.1% | 1.8% | 1.8% | 16.0% |
| Talc dispersion | 2.9% | 3.0% | 2.4% | 2.5% |  |
| Butanol | 7.0% | 7.4% | 7.3% | 2.4% | 6.3% |
| Ethylene glycol monobutyl ether | 1.4% | 1.5% | 1.5% | 1.5% | 1.3% |
| Diethylene glycol monobutyl ether | 2.4% | 2.5% | 2.5% | 1.5% | 2.8% |
| Dipropylene glycol methyl ether | 0.9% | 1.0% | 1.0% | 1.0% | 1.0% |
| DI water | 44.4% | 39.9% | 43.7% | 50.3% | 44.0% |
| Mineral spirit | 1.0% | 1.0% | 1.0% | 1.0% | 1.0% |
| Polypropylene glycol | 1.0% | 1.1% | 2.6% | 2.7% | 0.9% |

-continued

| | | | | | |
|---|---|---|---|---|---|
| Others (defoamer, leveling agent, additives, dye, amine) | 4.7% | 5.1% | 4.8% | 4.6% | 3.6% |
| pH | 8.9 | 8.9 | 8.9 | 8.8 | 8.9 |
| Solid wt % | 19 | 20 | 21 | 21 | 19 |
| Solid vol % | 17 | 18 | 18 | 19 | 16 |
| Viscosity (mPa · s) at | | | | | |
| 0.1 s−1 | 23 | 3060 | 6209 | | 28 |
| 1000 s−1 | 11 | 93 | 91 | 5 | 12 |
| Viscosity (mPa · s) at 1 s−1 and 5 second after 10,000 s−1 shear | 11 | 578 | 71 | 3 | 9 |
| Yield stress (Pa) | 0 | 0.1 | 1 | 0 | 0 |
| ASTM D4400-18 w/ASM-2 and ASM-1 Anti-Sag meter, on coil coated panel, 45 degree, 4 min RT flash | | | | | |
| Max drawdown bar gap w/o fat edge (mil) | <1 | 3.0 | 3.5 | <1 | <1 |
| Max drawdown bar gap w/o sag nose (mil) | 1.0 | 3.5 | 4.5 | <1 | <1 |
| Min drawdown bar gap w/sag nose (mil) | 1.5 | 4.0 | 5.0 | 1.0 | 1.0 |
| Print on coil coat and clearcoat metal panels, 45 degree, Average, 4 min RT flash | | | | | |
| Max DFT w/o fat edge (um) | <12 | <10 | <11 | <6 | <10 |
| Calculated wet film thickness w/o fat edge (um) | <71 | <59 | <58 | <32 | <63 |
| Max DFT w/o sag nose (um) | <12 | 10 | <11 | <6 | <10 |
| Calculated wet film thickness w/o sag nose (um) | <71 | 57 | <58 | <32 | <63 |
| Min DFT w/sag nose (um) | <12 | 12 | <11 | <6 | <10 |
| Calculated wet film thickness w sag nose (um) | <71 | 64 | <58 | <32 | <63 |

In various non-limiting embodiments, all values and ranges of values, both whole and fractional, including and between the aforementioned values set forth in the Examples above, are hereby expressly contemplated for use herein independent from these exact Examples.

Some of the compounds utilized in the Examples above are further described as follows:

| Compound | Chemical Description |
|---|---|
| Alkali Swellable Emulsion | The acrylic alkali emulsion is commercially available from BASF Corporation of Florham Park, New Jersey under the tradename Rheovis® AS 1130, about 30 wt % solid |
| Layered Silicate | Layered silicate rheology control agent is provided in a solution of water and polypropylene glycol which is similar to a solution commercially available from Altana under the trade name Laponite RD (Laponite SH is used here) |
| Acrylic Latex Dispersion 1 | polyester-modified acrylic dispersion containing epoxy groups has a trade name of Daotan® VTW 1686/40WA commercially available by Allnex, about 40 wt % solid |
| Acrylic Latex Dispersion 2 | Styrene-acrylic latex dispersion is formed by a two-step emulsion polymerization process, 46 wt % solid, Tg ~−7 C, acid number ~12, hydroxyl number ~7 |
| Polyurethane Dispersion 1 | Polyurethane dispersion resin formed from a slightly branched polyester polyol (equivalent weight ~485, hydroxyl content 3.5%, Desmophen 670 BA) and hexamethylene diisocyanate, about 40 wt % solid |
| Polyurethane Dispersion 2 | Polyurethane dispersion resin formed from a linear polyester diol resin (reaction product of monomers 1,6-hexanediol, adipic acid, and isophthalic acid) and isophorone diisocyanate. About 35 wt % solid |
| Polyurethane Dispersion 3 | Polyurethane dispersion resin formed from a linear polycarbonate-polyester polyol (equivalent weight ~1000, hydroxyl content 1.7%, Desmophen C1200) and isophorone diisocyanate. About 41 wt % solid |
| Polyurethane Dispersion 4 | Polyester-polyurethane polymer having the tradename Bayhydrol® U 241 which is commercially available from Covestro AG of Leverkusen, Germany, about 41 wt % solid |
| HMMM Melamine | Hexa(methoxymethyl)melamine (HMMM) melamine formaldehyde resin commercially available from Allnex under the trade name Cymel 303 |
| High Imino Melamine | High imino melamine-formaldehyde resin commercially available from Allnex under the trade name as Cymel 325 |

| Compound | Chemical Description |
|---|---|
| Black Pigment Dispersion | Dispersion of amorphous carbon black pigment, 16 wt % carbon black |
| Talc Dispersion | Dispersion of micronized talc extender pigment, 36 wt % talc |

The data set forth above show that Compositions 2, 3, and 4 are excellent performers, especially as compared to Compositions 1, 5, and 6. Compositions 2, 3, and 4 also have high yield stress and low shear viscosity which are indicative of excellent performance. Compositions 7-10 are evaluated as additional examples that are shown to provide adequate sag control. Composition 11 is evaluated to show the result on sag performance without any thickeners.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method of applying a one-component waterborne coating composition to a substrate utilizing a high transfer efficiency applicator to form a coating layer disposed on the substrate, the method comprising the steps of:
   providing the coating composition to the high transfer efficiency applicator; and
   applying the coating composition to the substrate through the high transfer efficiency applicator to form the coating layer on the substrate wherein a loss of volatiles after application through the high transfer efficiency applicator is less than about 0.5 weight percent actives based on a total weight of the coating composition,
   wherein the coating composition has a pH of greater than about 7 and comprises:
   A. a resin dispersion comprising a latex, a polyurethane, or combinations thereof;
   B. an optional cross-linker;
   C. an optional pigment;
   D. water;
   E. a water-soluble solvent; and
   F. at least one rheology control agent chosen from an alkali swellable emulsion, a layered silicate, and combinations thereof;
   wherein the coating composition has a viscosity of about 20 to about 100 mPa·s as determined using ASTM 7867-13 with cone-and-plate or parallel plates at a shear rate of 1000 sec-1,
   wherein the coating composition has a viscosity of from about 2000 to about 6500 mPa·s as determined using ASTMD7867 at a shear rate of 0.1 sec-1,
   wherein the coating composition has a wet film thickness of at least 20 microns measured at about 45 degrees without visible sag, and
   wherein the coating composition has a wet film thickness of at least 71 microns measured at about 45 degrees without fat edge.

2. The method of claim 1 wherein:
   A. the resin dispersion is present in an amount of from about 10 to about 35 weight percent actives based on a total weight of the composition;
   B. the cross-linker is melamine and is present in an amount of from about 2 to about 8 weight percent actives based on a total weight of the composition;
   C. the pigment is present in an amount of from about 0.1 to about 20 weight percent actives based on a total weight of the composition;
   D. the water is present in an amount of from about 15 to about 80 weight percent actives based on a total weight of the composition;
   E. the water soluble solvent is present in a total amount of from about 5 to about 25 weight percent actives based on a total weight of the composition; and
   F. the at least one rheology control agent is present in an amount of from about 0.01 to about 7 weight percent actives based on a total weight of the composition;
   wherein the coating composition has a viscosity of about 35 to about 95 cPs as determined using ASTM 7867-13 with cone-and-plate or parallel plates at a shear rate of 1000 sec-1, and
   wherein the coating composition has a wet film thickness of at least about 20 microns measured at about 45 degrees without visible sag as determined using ASTM D4400-18.

3. The method of claim 1 wherein:
   A. the resin dispersion is present in an amount of from about 12 to about 20 weight percent actives based on a total weight of the composition and comprises:
   an acrylic latex dispersion present in an amount of from about 3 to about 5 weight percent actives based on a total weight of the composition and that is a polyester-modified acrylic dispersion containing epoxy groups;
   a first polyurethane dispersion present in an amount of about 1.5 to about 2.5 weight percent actives based on a total weight of the composition and that is formed from a branched polyester polyol and hexamethylene diisocyanate;
   a second polyurethane dispersion present in an amount of from about 1 to about 2 weight percent actives based on a total weight of the composition and that is formed from a linear polyester diol resin and isophorone diisocyanate wherein the linear polyester diol is the reaction product of 1,6-hexanediol, adipic acid, and isophthalic acid; and
   a third polyurethane dispersion present in an amount of from about 0.5 to about 1.5 weight percent actives based on a total weight of the composition and that is formed from a linear polycarbonate-polyester polyol and isophorone diisocyanate;

B. the cross-linker is melamine and is present in an amount of from about 3 to about 4 weight percent actives based on a total weight of the composition;
C. the pigment dispersion is present in an amount of from about 0.5 to about 4.5 weight percent actives based on a total weight of the composition;
D. the water is present in an amount of from about 55 to about 70 weight percent actives based on a total weight of the composition;
E. the water soluble solvent is butanol and is present in an amount of from about 10 to about 20 weight percent actives based on a total weight of the composition; and
F. the at least one rheology control agent is the alkali swellable emulsion that is an acrylic copolymer emulsion and that is present in an amount of from about 0.1 to about 2 weight percent actives based on a total weight of the composition;
wherein the coating composition has a viscosity of about 35 to about 70 cps as determined using ASTM 7867-13 with cone-and-plate or parallel plates at a shear rate of 1000 sec-1, and
wherein the coating composition has a wet film thickness of at least about 20 microns measured at about 45 degrees without visible sag as determined using ASTM D4400-18.

4. The method of claim 1 wherein the coating composition consists essentially of (A)-(F) wherein:
A. the resin dispersion is present in an amount of from about 10 to about 35 weight percent actives based on a total weight of the composition;
B. the cross-linker is melamine and is present in an amount of from about 2 to about 8 weight percent actives based on a total weight of the composition;
C. the pigment is present in an amount of from about 0.1 to about 20 weight percent actives based on a total weight of the composition;
D. the water is present in an amount of from about 15 to about 70 weight percent actives based on a total weight of the composition;
E. the water soluble solvent is present in a total amount of from about 5 to about 25 weight percent actives based on a total weight of the composition;
the coating composition has a viscosity of about 35 to about 95 cPs as determined using ASTM 7867-13 with cone-and-plate or parallel plates at a shear rate of 1000 sec-1;
the coating composition has a wet film thickness of at least about 20 microns measured at about 45 degrees without visible sag as determined using ASTM D4400-18;
the latex is present and is chosen from a polyester-modified acrylic dispersion containing epoxy groups, a styrene-acrylic latex dispersion, and combinations thereof;
the polyurethane is present and is chosen from one formed from a branched polyester polyol and hexamethylene diisocyanate; formed from a linear polyester diol resin and isophorone diisocyanate wherein the linear polyester diol is the reaction product of 1,6-hexanediol, adipic acid, and isophthalic acid; formed from a linear polycarbonate-polyester polyol and isophorone diisocyanate; a polyester-polyurethane polymer; and combinations thereof;
the alkali swellable emulsion is present, is an acrylic copolymer emulsion, and is present in an amount of from about 0.1 to about 2 weight percent actives based on a total weight of the composition; and
the layered silicate is optionally present in an amount of from 0 to about 0.3 weight percent actives based on a total weight of the composition and is a synthetic phyllosilicate.

5. The method of claim 1 wherein the resin dispersion is present in an amount of from about 10 to about 35 weight percent actives based on a total weight of the composition; the cross-linker is melamine and is present in an amount of from about 2 to about 8 weight percent actives based on a total weight of the composition; the pigment is present in an amount of from about 0.1 to about 20 weight percent actives based on a total weight of the composition; the water is present in an amount of from about 15 to about 70 weight percent actives based on a total weight of the composition; the water soluble solvent is present in a total amount of from about 5 to about 25 weight percent actives based on a total weight of the composition; and the at least one rheology control agent is present in an amount of from about 0.01 to about 7 weight percent actives based on a total weight of the composition; wherein the coating composition has a viscosity of about 35 to about 95 cPs as determined using ASTM 7867-13 with cone-and-plate or parallel plates at a shear rate of 1000 sec-1, and wherein the coating composition has a wet film thickness of at least about 20 microns measured at about 45 degrees without visible sag as determined using ASTM D4400-18.

6. The method of claim 1 wherein the resin dispersion is present in an amount of from about 12 to about 20 weight percent actives based on a total weight of the composition and comprises: an acrylic latex dispersion present in an amount of from about 3 to about 5 weight percent actives based on a total weight of the composition and that is a polyester-modified acrylic dispersion containing epoxy groups; a first polyurethane dispersion present in an amount of about 1.5 to about 2.5 weight percent actives based on a total weight of the composition and that is formed from a branched polyester polyol and hexamethylene diisocyanate; a second polyurethane dispersion present in an amount of from about 1 to about 2 weight percent actives based on a total weight of the composition and that is formed from a linear polyester diol resin and isophorone diisocyanate wherein the linear polyester diol is the reaction product of 1,6-hexanediol, adipic acid, and isophthalic acid; and a third polyurethane dispersion present in an amount of from about 0.5 to about 1.5 weight percent actives based on a total weight of the composition and that is formed from a linear polycarbonate-polyester polyol and isophorone diisocyanate; the cross-linker is melamine and is present in an amount of from about 3 to about 4 weight percent actives based on a total weight of the composition; the pigment dispersion is carbon black and is present in an amount of from about 0.5 to about 4.5 weight percent actives based on a total weight of the composition; the water is present in an amount of from about 55 to about 70 weight percent actives based on a total weight of the composition; the water soluble solvent is butanol and is present in an amount of from about 10 to about 20 weight percent actives based on a total weight of the composition; and the at least one rheology control agent is the alkali swellable emulsion that is an acrylic copolymer emulsion and that is present in an amount of from about 0.1 to about 2 weight percent actives based on a total weight of the composition; wherein the coating composition has a viscosity of about 35 to about 70 cps as determined using ASTM 7867-13 with cone-and-plate or parallel plates at a shear rate of 1000 sec-1, and wherein the coating composition has a wet film thickness of at least about 20 microns measured at about 45 degrees without visible sag as determined using ASTM D4400-18.

7. The method of claim 1 wherein the alkali swellable emulsion is present and is an acrylic copolymer emulsion and the layered silicate is present and is a synthetic phyllosilicate.

8. The method of claim 1 wherein:
the latex is chosen from a polyester-modified acrylic dispersion containing epoxy groups, a styrene-acrylic latex dispersion, and combinations thereof; and
the polyurethane is chosen from one formed from a branched polyester polyol and hexamethylene diisocyanate; formed from a linear polyester diol resin and isophorone diisocyanate wherein the linear polyester diol is the reaction product of 1,6-hexanediol, adipic acid, and isophthalic acid; formed from a linear polycarbonate-polyester polyol and isophorone diisocyanate; a polyester-polyurethane polymer; and combinations thereof.

9. The method of claim 8 wherein the latex is the polyester-modified acrylic dispersion containing epoxy groups.

10. The method of claim 9 wherein the polyurethane is formed from a branched polyester polyol and hexamethylene diisocyanate.

11. The method of claim 9 wherein the polyurethane is formed from a linear polyester diol resin and isophorone diisocyanate wherein the linear polyester diol is the reaction product of 1,6-hexanediol, adipic acid, and isophthalic acid.

12. The method of claim 9 wherein the polyurethane is formed from a linear polycarbonate-polyester polyol and isophorone diisocyanate.

13. The method of claim 9 wherein the polyurethane is a polyester-polyurethane polymer.

14. The method of claim 8 wherein the latex is the styrene-acrylic latex dispersion.

15. The method of claim 14 wherein the polyurethane is formed from a branched polyester polyol and hexamethylene diisocyanate.

16. The method of claim 14 wherein the polyurethane is formed from a linear polyester diol resin and isophorone diisocyanate wherein the linear polyester diol is the reaction product of 1,6-hexanediol, adipic acid, and isophthalic acid.

17. The method of claim 14 wherein the polyurethane is formed from a linear polycarbonate-polyester polyol and isophorone diisocyanate.

18. The method of claim 14 wherein the polyurethane is a polyester-polyurethane polymer.

* * * * *